US012204440B2

(12) United States Patent
Myers et al.

(10) Patent No.: US 12,204,440 B2
(45) Date of Patent: *Jan. 21, 2025

(54) METHOD AND SYSTEM FOR PROGRAMMATICALLY TESTING USER INTERFACE PATHS

(71) Applicant: Express Scripts Strategic Development, Inc., St. Louis, MO (US)

(72) Inventors: Christopher M. Myers, Dublin, OH (US); Ellen E. Seeser, St. Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,947

(22) Filed: Oct. 30, 2023

(65) Prior Publication Data

US 2024/0054069 A1 Feb. 15, 2024

Related U.S. Application Data

(63) Continuation of application No. 17/866,914, filed on Jul. 18, 2022, now Pat. No. 11,803,465, which is a
(Continued)

(51) Int. Cl.
  *G06F 11/36* (2006.01)
  *G06F 17/18* (2006.01)
  (Continued)

(52) U.S. Cl.
  CPC ...... *G06F 11/3688* (2013.01); *G06F 11/3664* (2013.01); *G06F 17/18* (2013.01); *G06N 3/045* (2023.01)

(58) Field of Classification Search
  CPC ............ G06F 11/3688; G06F 11/3664; G06F 17/18; G06F 2201/875; G06F 8/38;
  (Continued)

(56) References Cited

U.S. PATENT DOCUMENTS 9,235,489 B2   1/2016  Xiong
9,274,932 B2 *  3/2016  Crossley ............. G06F 11/3664
(Continued)

OTHER PUBLICATIONS

Kurin, Erik, and Adam Melin. "Data-driven test automation: Augmenting gui testing in a web application." (2013). (Year: 2013).
(Continued)

*Primary Examiner* — Matthew J Brophy
(74) *Attorney, Agent, or Firm* — Miller Johnson

(57) ABSTRACT

A computer system for testing a user interface includes a memory circuit and a processor circuit configured to execute instructions including obtaining a state of the user interface. The instructions include setting a current position to a specified location within the user interface. The instructions include executing user interface tests to generate multiple paths. The instructions include determining a shortest path toward a goal location by identifying a path having a minimum distance that satisfies criteria. A distance for the path is based on two-dimensional distances between pairs of consecutive positions that include the current position as well as positions, along the particular path, of user interface elements requiring interaction to satisfy the criteria. The instructions including generating a preferred path based on preferred path information indicative of a specified path toward the goal location, comparing the determined shortest path to the generated preferred path, and outputting an analysis result.

20 Claims, 25 Drawing Sheets

Related U.S. Application Data continuation of application No. 16/670,272, filed on Oct. 31, 2019, now Pat. No. 11,392,484.

(51) Int. Cl.
 *G06N 3/04* (2023.01)
 *G06N 3/045* (2023.01)

(58) Field of Classification Search
 CPC ............. G06F 11/3438; G06F 11/3684; G06F 17/11; G06N 3/045; G06N 3/08; G06N 7/01
 See application file for complete search history.

(56) References Cited

U.S. PATENT DOCUMENTS

| | | | |
|---|---|---|---|
| 9,501,053 B2 | 11/2016 | Chien-Yi | |
| 9,946,637 B2* | 4/2018 | Zhang | G06F 11/3688 |
| 10,114,733 B1* | 10/2018 | Varghese | G06F 8/38 |
| 10,115,172 B2 | 10/2018 | Goldberg | |
| 10,747,655 B2* | 8/2020 | Myers | G06F 11/3696 |
| 10,795,701 B2* | 10/2020 | Myers | G06F 3/167 |
| 11,099,640 B2* | 8/2021 | Myers | G06F 3/013 |
| 2003/0223373 A1 | 12/2003 | Nakamura | |
| 2007/0294586 A1* | 12/2007 | Parvathy | G06F 11/3672 |
| | | | 714/E11.193 |
| 2009/0197234 A1 | 8/2009 | Creamer | |
| 2010/0064282 A1* | 3/2010 | Triou | G06F 11/3696 |
| | | | 717/124 |
| 2012/0290920 A1* | 11/2012 | Crossley | G06F 11/3664 |
| | | | 715/234 |
| 2013/0326427 A1* | 12/2013 | Elias | G06F 9/451 |
| | | | 715/854 |
| 2014/0059522 A1* | 2/2014 | Chandra | G06F 11/3684 |
| | | | 717/126 |
| 2015/0370688 A1* | 12/2015 | Zhang | G06F 11/368 |
| | | | 717/125 |
| 2015/0370694 A1* | 12/2015 | Zhang | G06F 11/3688 |
| | | | 717/124 |
| 2016/0196021 A1* | 7/2016 | Rahulkrishna | G06F 11/3688 |
| | | | 715/760 |
| 2017/0139723 A1* | 5/2017 | Holland | G06F 11/3438 |
| 2018/0113782 A1 | 4/2018 | Valacich | |
| 2019/0026949 A1 | 1/2019 | Alabastro | |
| 2019/0034172 A1* | 1/2019 | Kostello | G06F 8/20 |
| 2019/0121617 A1* | 4/2019 | Shack | G06F 8/38 |
| 2019/0171550 A1 | 6/2019 | Eizenman | |
| 2019/0205777 A1* | 7/2019 | Vlaskamp | G16H 50/00 |
| 2019/0265060 A1* | 8/2019 | Han | G06N 20/00 |
| 2019/0294527 A1 | 9/2019 | Teitelbaum | |
| 2020/0158734 A1* | 5/2020 | Loken | G16B 40/00 |
| 2020/0159315 A1* | 5/2020 | Myers | G06F 11/3438 |
| 2020/0159550 A1* | 5/2020 | Myers | G06F 11/3664 |
| 2020/0159651 A1* | 5/2020 | Myers | G06F 30/20 |
| 2020/0233788 A1* | 7/2020 | Reda | G06F 11/3692 |
| 2021/0081309 A1* | 3/2021 | Golubev | G06F 11/3692 |
| 2021/0109717 A1* | 4/2021 | Voicu | G06F 11/3438 |
| 2024/0054069 A1* | 2/2024 | Myers | G06N 7/01 |

OTHER PUBLICATIONS

Zaeem, Razieh Nokhbeh, Mukul R. Prasad, and Sarfraz Khurshid. "Automated generation of oracles for testing user-interaction features of mobile apps." 2014 IEEE Seventh International Conference on Software Testing, Verification and Validation. IEEE, 2014. (Year: 2014).

Valdes, Olivia Rodriguez. "Finding the shortest path to reproduce a failure found by TEST AR." Proceedings of the 2019 27th ACM Joint Meeting on European Software Engineering Conference and Symposium on the Foundations of Software Engineering. Aug. 26-30, 2019. (Year: 2019).

Arlt, Stephan, et al. "Grey-box gui testing: Efficient generation of event sequences." arXiv preprint arXiv: 1205.4928 (2012). (Year: 2012).

Silva, Jose L., Jose Creissac Campos, and Ana CR Paiva. "Model-based user interface testing with spec explorer and concurtasktrees." Electronic Notes in Theoretical Computer Science 208 (2008): 77-93. (Year: 2008).

\* cited by examiner

METHOD AND SYSTEM FOR PROGRAMMATICALLY TESTING USER INTERFACE PATHS

CROSS REFERENCE TO RELATED APPLICATIONS

This application is a continuation of U.S. application Ser. No. 17/866,914 (now U.S. Pat. No. 11,803,465) filed Jul. 18, 2022, which is a continuation of U.S. application Ser. No. 16/670,272 (now U.S. Pat. No. 11,392,484), which was filed Oct. 31, 2019. The entire disclosure of said application is incorporated herein by reference.

FIELD

The present disclosure relates to user interface testing and, more particularly, to comparing a shortest path to a goal in the user interface and a preferred path to the goal in the user interface, to transform the user interface.

BACKGROUND

Currently, entities such as companies offer customers (or, users) a variety of methods to access information—for example, a status of an order that the customer placed. The customer may call the company, or may access a web page associated with the company, to obtain the information. The customer may need to navigate a user interface (UI) of an application to access the information. As an example, the customer may need to log in to a web application with a username and password before they are able to access the information. Many customers may be unable to properly navigate the UI—for example, to log in to the web application and navigate to the pertinent screen—and, therefore, may opt to call the company to obtain the information.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system for testing a user interface (UI) includes a test creation module, a test execution module, a path entry module, and an analysis module. The test creation module is configured to obtain testing parameters. The testing parameters include (i) a location at which the UI can be accessed and (ii) criteria for a goal associated with the UI. The test execution module is configured to obtain a state of the UI based on the location; set a current position to a predetermined location within the UI; execute one more UI tests according to the obtained state of the UI and the current position; from each of a set of completed UI tests, store at least one of test distance and test data results; and determine a shortest path toward the goal in the UI based on the set of completed UI tests. The path entry module is configured to (i) receive preferred path information indicative of a specified path through the UI toward the goal in the UI and (ii) generate a preferred path based on the received preferred path information. The analysis module is configured to (i) compare the determined shortest path to the generated preferred path and (ii) output an analysis result according to the comparison of the determined shortest path to the generated preferred path.

In other features, each path in the set of completed UI tests is composed of UI events and is characterized by a distance. The path having the minimum distance is identified as the shortest path. For each path, the distance of the path is based on a sum of Euclidean distances between screen locations of each pair of consecutive UI events in the path. In other features, the test execution module is configured to analyze a designated state of the UI. The test execution module is configured to, in response to determining that the designated state satisfies the criteria for the goal, set a success indicator as an outcome. The test execution module is configured to, in response to determining that the designated state of the UI does not satisfy the criteria for the goal, determine a set of possible actions based on UI elements within the designated state and set the set of possible actions as the outcome. The test execution module is configured to, in response to the outcome being the set of possible actions, select an action from the set of possible actions where the action is associated with a first UI element; identify a point of the first UI element; update a test distance based on (i) coordinates of the point and (ii) coordinates of the current position; set the current position to the point; execute the selected action; and supplement test data with (i) the selected action and (ii) the set of possible actions. The test execution module is configured to, in response to the outcome being the success indicator, store the test distance and the test data in the set of completed UI tests.

In other features, the analysis module is configured to, for each action in the set of possible actions, (i) determine a probability that performing the action will result in the goal and (ii) store the determined probability in the set of possible actions. Selecting the action from the set of possible includes selecting the action from the set of possible actions based on probabilities stored in the set of possible actions.

In other features, the computer system includes a neural network module configured to operate a plurality of neural networks. The analysis module is configured to selectively use at least one neural network of the plurality of neural networks to determine the probability that performing the action will result in the goal. In other features, the computer system includes a training module configured to, in response to the outcome being the success indicator, train the plurality of neural networks using the test data; determine a performance of the plurality of neural networks after training based on the probabilities stored in the set of completed UI tests; and in response to determining that a value of the performance of the plurality of neural networks after training is greater than a predetermined value, set a status of the plurality of neural networks to trained. In other features, the analysis result includes a calculated score indicative of a similarity between (i) distances and elements of the determined shortest path and (ii) distances and elements of the generated preferred path.

In other features, the analysis result includes a graphical visualization illustrating one or more links in the UI that are common to the determined shortest path and the generated preferred path, and links that are different between the determined shortest path and the generated preferred path. In other features, the path entry module is configured to receive the preferred path information by entry of a full preferred path via document object model (DOM) recording of interactions with the UI. In other features, the path entry module is configured to receive the preferred path information by retrieval of stored menu element weights for menu elements of the UI. In other features, the path entry module is configured to receive the preferred path information by storing a configuration of randomized and trained menu element weights for menu elements of the UI.

A method of testing a user interface (UI) includes obtaining testing parameters. The testing parameters include (i) a location at which the UI can be accessed and (ii) criteria for a goal associated with the UI. The method includes obtaining a state of the UI based on the location. The method includes setting a current position to a predetermined location within the UI. The method includes executing one more UI tests according to the obtained state of the UI and the current position. The method includes, from each of a set of completed UI tests, storing at least one of test distance and test data results. The method includes determining a shortest path toward the goal in the UI based on the set of completed UI tests. The method includes receiving preferred path information indicative of a specified path through the UI toward the goal in the UI. The method includes generating a preferred path based on the received preferred path information. The method includes comparing the determined shortest path to the generated preferred path. The method includes outputting an analysis result according to the comparison of the determined shortest path to the generated preferred path.

In other features, each path in the set of completed UI tests is composed of UI events and is characterized by a distance. The path having the minimum distance is identified as the shortest path. For each path, the distance of the path is based on a sum of Euclidean distances between screen locations of each pair of consecutive UI events in the path.

In other features, the method includes analyzing a designated state of the UI. The method includes, in response to determining that the designated state satisfies the criteria for the goal, setting a success indicator as an outcome. The method includes, in response to determining that the designated state of the UI does not satisfy the criteria for the goal, determining a set of possible actions based on UI elements within the designated state and setting the set of possible actions as the outcome.

The method includes, in response to the outcome being the set of possible actions, selecting an action from the set of possible actions, where the action is associated with a first UI element; identifying a point of the first UI element; updating a test distance based on (i) coordinates of the point and (ii) coordinates of the current position; setting the current position to the point; executing the selected action; and supplementing test data with (i) the selected action and (ii) the set of possible actions. The method includes, in response to the outcome being the success indicator, storing the test distance and the test data in the set of completed UI tests.

In other features, the method includes, for each action in the set of possible actions, (i) determining a probability that performing the action will result in the goal and (ii) storing the determined probability in the set of possible actions. Selecting the action from the set of possible includes selecting the action from the set of possible actions based on probabilities stored in the set of possible actions. In other features, the method includes operating a plurality of neural networks. The method includes selectively using at least one neural network of the plurality of neural networks to determine the probability that performing the action will result in the goal.

In other features, the method includes, in response to the outcome being the success indicator, training the plurality of neural networks using the test data; determining a performance of the plurality of neural networks after training based on the probabilities stored in the set of completed UI tests; and, in response to determining that a value of the performance of the plurality of neural networks after training is greater than a predetermined value, setting a status of the plurality of neural networks to trained.

In other features, the analysis result includes a calculated score indicative of a similarity between (i) distances and elements of the determined shortest path and (ii) distances and elements of the generated preferred path. In other features, the analysis result includes a graphical visualization illustrating one or more links in the UI that are common to the determined shortest path and the generated preferred path, and links that are different between the determined shortest path and the generated preferred path. In other features, the method includes receiving the preferred path information by at least one of entry of a full preferred path via document object model (DOM) recording of interactions with the UI, retrieval of stored menu element weights for menu elements of the UI, and storing a configuration of randomized and trained menu element weights for menu elements of the UI.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

High-Volume Pharmacy

Figure 1:
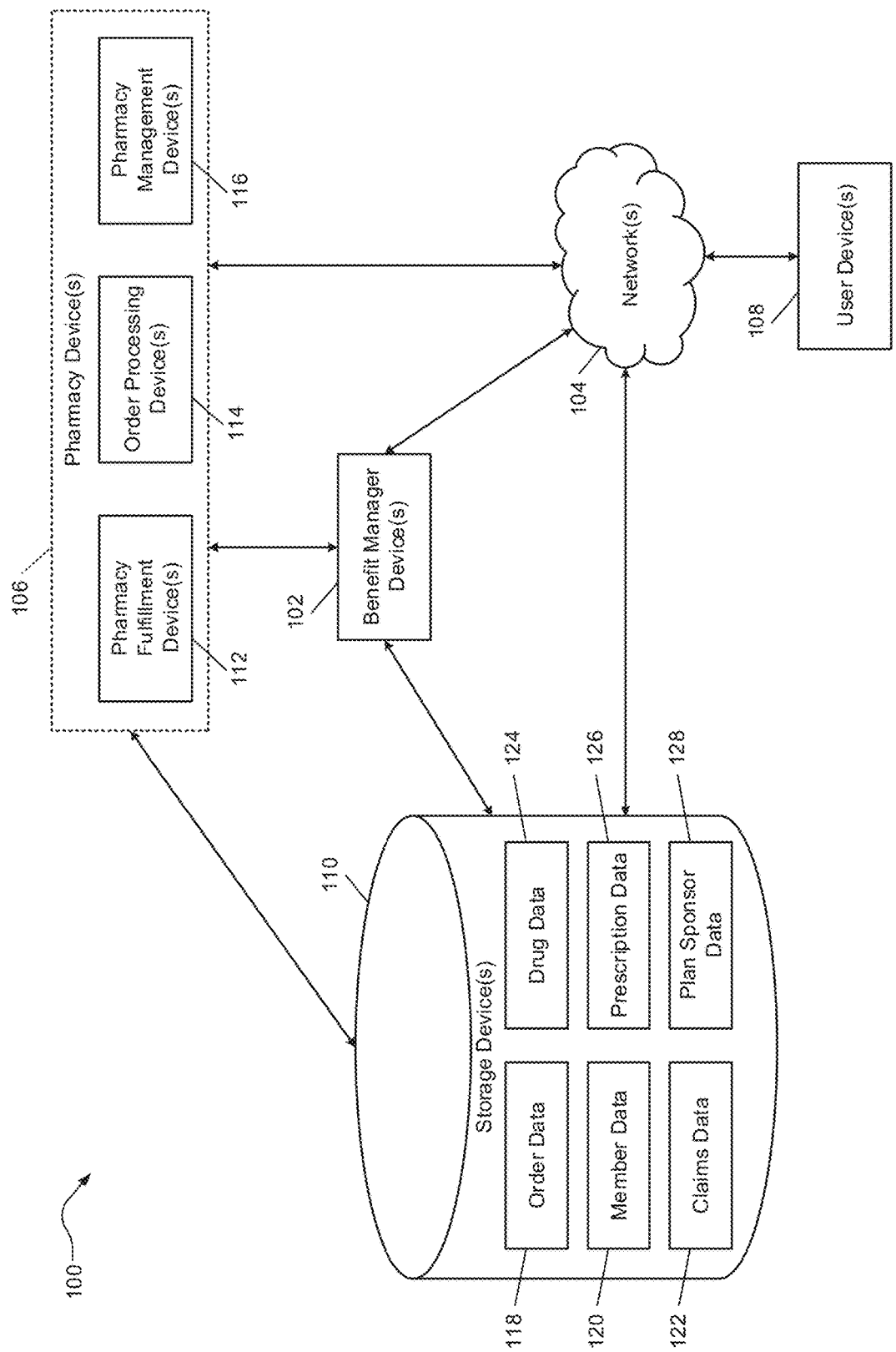
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly using a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
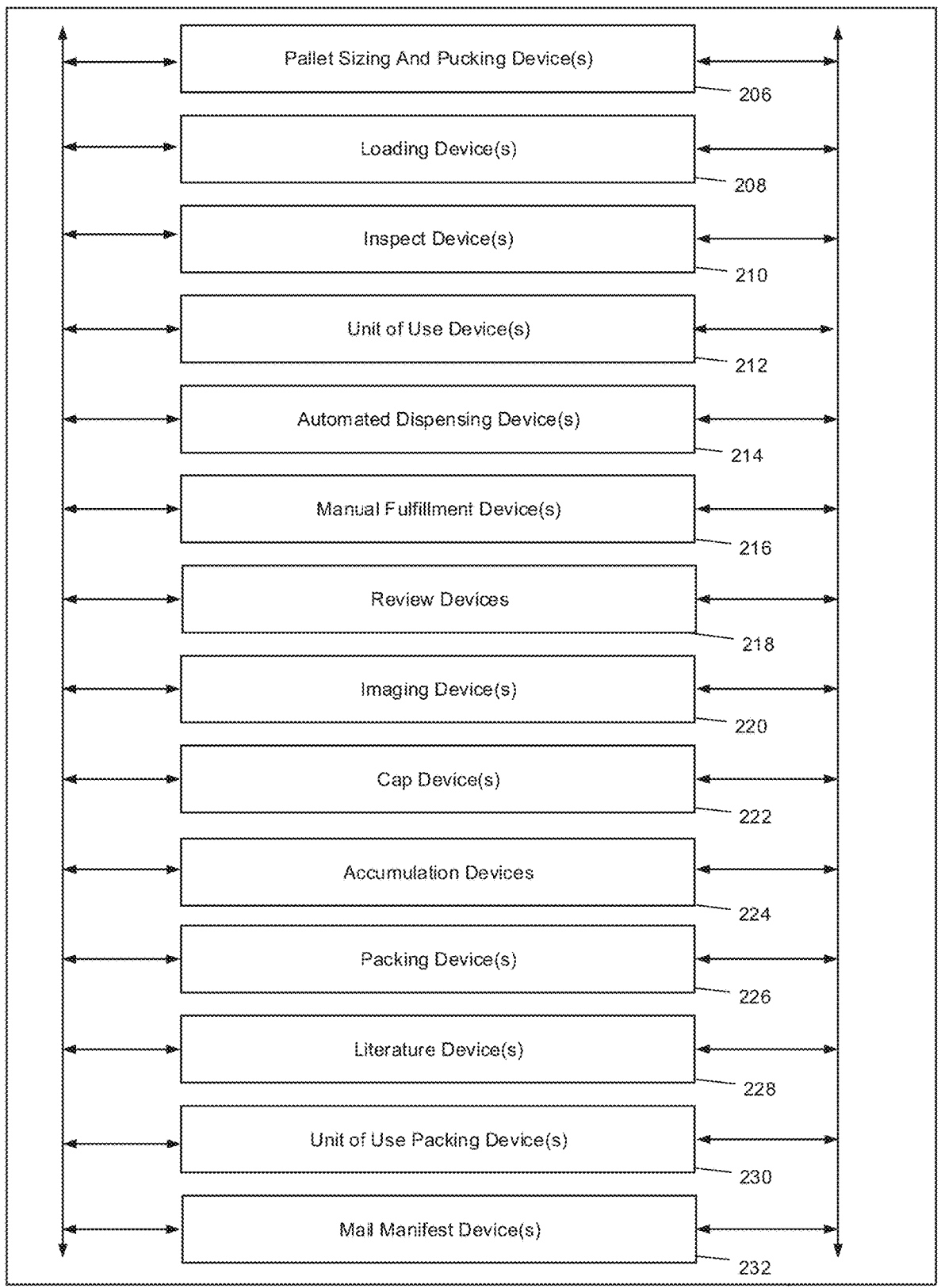
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
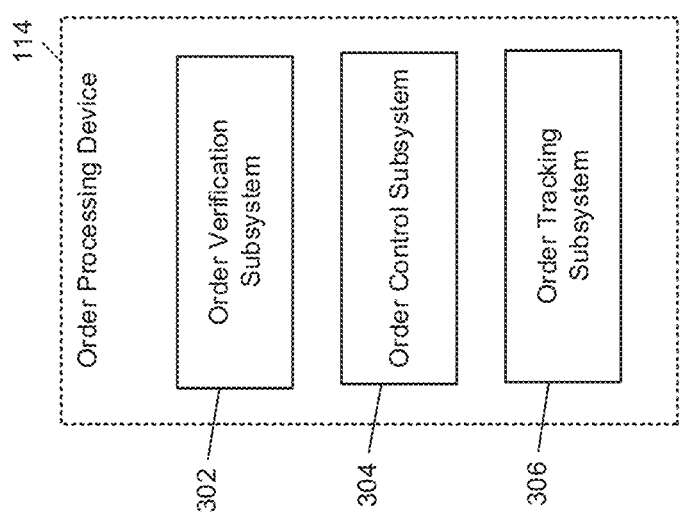
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

UI Testing System

A user interface (UI) provides access to information and may permit various actions to be performed. However, a user may need to perform certain actions in the UI before the user is able to access information of interest. As an example, a user may need to first log in with a username and password. Then, before they can access the information, they may need to navigate to a certain screen of the UI and select a particular button. Many users may not be able to efficiently navigate the UI to obtain the information.

In various implementations, a shortest path to a given goal in a UI—such as logging in and obtaining an order status—may be automatically determined. The length of the path may be measured using a variety of metrics, such as the number of inputs required, the total movement of the mouse, the number of keystrokes or mouse click events, etc. In various implementations, the length of the path may be assessed based on total Euclidean distance of mouse travel—that is, the sum of linear movements to each UI element where interaction is necessary (for example, from a starting point to a textbox, from the textbox to a submit button, and from the location of the submit button to a link that is to be selected).

Separately, a website developer may enter a preferred path to the goal in the UI via one or more of various preferred path entry methods. The preferred path may include a developer's intended movement of the mouse between different links, buttons, fields, etc. of one or more screens of the UI in order to reach the goal. For example, the preferred path may be determined in order to increase usability of the UI for a user, to follow a user's expected intuitive navigation of the UI, etc. Multiple preferred paths may be generated that are different from one another, which may each correspond to a different type of user such as a first-time UI user, an experienced UI user, etc.

The shortest path may be compared to one or more preferred paths to enhance the UI. For example, the preferred path(s) may be compared to the shortest path during development of the UI in an effort to minimize the distance required when placing objects, menus, etc. in the UI, to allow a developer to determine how close a preferred path is to the shortest path and to make appropriate adjustments to the UI if desired.

Figure 4:
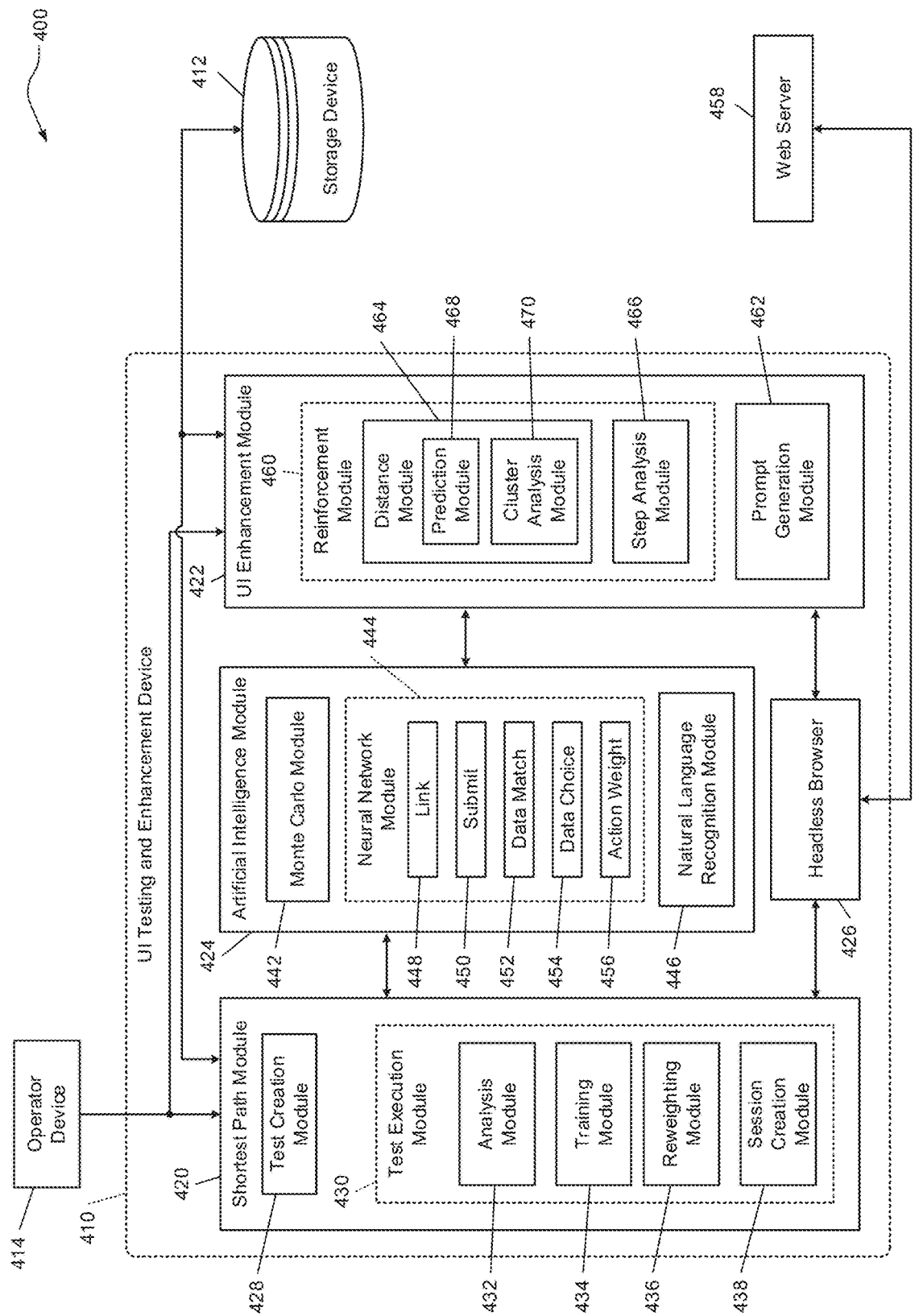
FIG. 4 is a functional block diagram of an example system for testing a user interface (UI).

FIG. 4 is a block diagram an of example implementation of a system 400 for testing a UI. The system 400 includes a UI testing and enhancement device 410, a storage device 412, and an operator device 414. The UI testing and enhancement device 410 may include a shortest path module 420, a UI enhancement module 422, an artificial intelligence (AI) module 424, and a headless browser 426. The storage device 412 may include nonvolatile storage in communication with the shortest path module 420 and the UI enhancement module 422.

The shortest path module 420 determines a shortest path to a given goal in a UI. For example, the shortest path module 420 may determine the shortest series of steps to log in to a web application, which may be measured according to the cumulative Euclidean distances between locations of each of the steps. A step is an action taken on a page of the UI—for example, clicking on a link or entering data into a text entry field. Execution of a step may change the state of the UI—that is, transitioning to a different screen or state of the UI, or changing the current state or screen so that more or different information or choices are available.

The shortest path module 420 includes a test creation module 428 and a test execution module 430. The test execution module 430 includes an analysis module 432, a training module 434, a reweighting module 436, and a session creation module 438.

The AI module 424 includes a Monte Carlo module 442, a neural network module 444, and a natural language recognition module 446. The Monte Carlo module 442 performs a Monte Carlo simulation to generate pseudorandom values. The neural network module 444 may include a link neural network 448, a submit neural network 450, a data match neural network 452, a data choice neural network 454, and an action weight neural network 456, each of which is described in more detail below.

The link neural network 448, the submit neural network 450, the data choice neural network 454, and the action weight neural network 456 each generate a probability that a given input will result in reaching the goal. For example, the data match neural network 452 generates a probability that a piece of data matches a data entry field—such as the probability that a particular text string matches a text entry field. The natural language recognition module 446 parses a text input and determines whether the input contains a specified text string. For example, the natural language recognition module 446 may be used to determine if a state of the UI includes a specific text string.

The headless browser 426 is a web browser that does not have a graphical user interface. The headless browser 426 may include a command-line interface used to load and interact with web pages, such as web pages of a web application hosted on a web server 458.

The test creation module 428 obtains test parameters and generates test configuration data. The test parameters may include a starting address of the UI, a goal, a maximum number of permitted steps to the goal, the number of tests to be conducted, and variable data. The variable data may include text strings—such as usernames or passwords—or menu options that may be entered into data entry fields of the UI. In some implementations, the test creation module 428 may receive the test parameters from the operator device 414. In other implementations, the test creation module 428 may retrieve previously stored test parameters from the storage device 412. The test creation module 428 provides the test configuration data to the test execution module 430. The test creation module 428 may also store the test configuration data in the storage device 412.

The test execution module 430 uses the test configuration data generated by the test creation module 428 to perform tests on the UI to determine a shortest path in the UI to the specified goal. In response to receiving the test configuration data from the test creation module 428, the test execution module 430 initiates the first test of the UI. For example, the test execution module 430 instructs the headless browser 426 to load the starting page of the UI. The headless browser 426 loads the requested web page and provides a document object model (DOM) of the loaded web page to the test execution module 430.

The test execution module 430 sets a position of the cursor to a predetermined position (such as the center) of the UI, marks each variable in the test configuration as unused, and sets the state of the neural networks in the neural network module 444 to untrained. The test execution module 430 uses the analysis module 432 to analyze the current state of the UI—in other words, the currently loaded web page. The analysis module 432 may use the DOM received from the headless browser 426 to perform the analysis.

The analysis module 432 first determines whether the current state of the UI satisfies the goal criteria—for example, that the loaded web page includes goal text. The analysis module 432 may use the natural language recognition module 446 to parse the text of the loaded web page to determine whether it includes the goal text. In response to locating the goal text, the analysis module 432 determines that the current test is a success. The current test is considered a failure when a maximum number of steps has been reached without the goal text being found. In response to determining that the current test is neither a success or failure, the analysis module 432 determines whether the current state of the UI includes interactive elements—for example, links, data entry fields, and elements that submit data—that can be executed to change the state of the UI.

The analysis module 432 assigns a probability to an action associated with each interactive element located in the loaded page. The probability represents the likelihood that executing the action will result in reaching the goal. If the neural networks in the neural network module 444 are trained, the analysis module 432 uses the neural networks in the neural network module 444 to determine the probability. The analysis module 432 also assigns a weighting to each type of action—link, entry field, and submit. If the neural networks in the neural network module 444 are trained, the analysis module 432 uses the neural networks in the neural network module 444 to determine the weight for each action type. The analysis module 432 then determines a weighted probability for each action. The analysis module 432 provides each identified action and the associated weighted probability to the test execution module 430. If the neural networks in the neural network module 444 are not yet trained, the analysis module 432 uses the Monte Carlo module 442 to assign random values for the probabilities of action success and action type success.

The test execution module 430 selects the action with the highest probability among the actions provided by the analysis module 432. The test execution module 430 determines the distance between the current position and the nearest point of the interactive element associated with the selected action. The test execution module 430 updates a total distance of the current test based on the calculated distance and then stores both the calculated distance as well as the total distance. The test execution module 430 instructs the headless browser 426 to perform the selected action. The executed action is referred to as a step, and the screen of the UI that results from the execution of the action is a state. In other words, performing a step results in transitioning the UI from a first state to a second state or results in transforming the first state.

The test execution module 430 concludes that the current test is a failure (that is, not a shortest path) if the total distance of the current test is greater than a previously identified path to the goal. Otherwise, the test execution module 430 proceeds with the test and analyzes the current state of the UI, as described above.

In response to determining that the current test is either a success or failure, the test execution module 430 logs the results of the completed test. In response to determining that the current test was a success, the test execution module 430 stores the steps of the current test as the shortest path to the goal. The test execution module 430 then determines whether the number of completed tests has reached the maximum number of tests. If so, the test execution module 430 outputs the shortest path found to the goal.

If more tests are needed, the test execution module 430 begins a new test. If the just-completed test was a success, the training module 434 trains (or, after the first training, retrains or supplements the training of) the neural networks in the neural network module 444. The training module 434 uses the results of the completed, successful test to generate training data. The training module 434 saves the neural networks in the neural network module 444 and the associated state of the neural networks—such as trained or untrained. In some implementations, the training module 434 may store both the neural networks and their associated state in storage device 412.

The training module 434 then retrains the link neural network 448, the submit neural network 450, the data match neural network 452, the data choice neural network 454, and the action weight neural network 456 using the generated training data. Once the neural networks have been retrained, the training module 434 determines the performance of the retrained networks. For example, the training module 434 sets the state of the neural networks in the neural network module 444 to trained. The training module 434 then uses the analysis module 432 to analyze each step of each completed test and produces a list of possible actions and associated probabilities. Since the status of the neural networks in the neural network module 444 is set to trained, the probabilities produced by the analysis module 432 will be based on the newly trained networks. For each action in each analyzed step, the training module 434 calculates a change between the previously determined probability and the newly determined probability.

The training module 434 determines the performance of the networks based on the calculated changes. In response to determining that retraining did not improve the performance of the neural networks in the neural network module 444, the training module 434 restores the neural networks in the neural network module 444 to their previous state. For example, the training module 434 may retrieve the stored networks and associated state from the storage device 412.

Next, the reweighting module 436 recalculates probabilities, such as for every action in every state of the last completed test. The reweighting module 436 calculates the probabilities using the neural networks in the neural network module 444—if they are trained—or updates the probabilities with new random values. The use of the neural networks in the neural network module 444 will result in probabilities that more closely match the actual probability that each action will result in the goal.

The test execution module 430 selects an action among the reweighted actions. The test execution module 430 bases the selection on the reweighted probability of each action and the total distance required to reach the action from the initial state of the UI.

The session creation module 438 determines the steps required to reach the action selected by the test execution module 430 from the initial URL of the UI. The session creation module 438 executes the determined steps required to reach the action, and the headless browser 426 returns the DOM of the resulting web page. The analysis module 432 then analyzes the current state of the UI, as described above.

The test execution module 430 continues to execute new tests until the maximum number of tests has been reached.

The UI enhancement module 422 generates prompts and other aids that can be used to guide a user to a given goal in a UI based on a shortest path to the goal and eye tracking experiments that correspond to the UI. Eye tracking experiments are a form of UI usability tests that include tracking data based on either the gaze of a user or the movement of a mouse cursor by the user while the user is navigating a UI to reach a goal. The eye tracking experiments are used to identify where a user of the UI is likely to deviate from the shortest path to the goal. The UI enhancement module 422 determines a distance for each page of the UI that represents a deviation from the shortest path that may require reinforcement of a shortest path step to aid the user in reaching the goal.

The UI enhancement module 422 includes a reinforcement module 460 and a prompt generation module 462. The reinforcement module 460 determines which steps of a shortest path may need reinforcement. The reinforcement module 460 bases the determination on the eye tracking experiments associated with the UI. The UI enhancement module 422 determines which steps of the shortest path require reinforcement based on the determination of the reinforcement module 460 and a received reinforcement percentage.

The reinforcement module 460 includes a distance module 464 and a step analysis module 466. The distance module 464 determines a reinforcement distance for each URL of the UI based on the eye tracking experiments associated with the goal and the shortest path to the goal. The reinforcement distance is a distance from a shortest path step—for example, the distance between a cursor and a point on the shortest path—that indicates that the step may require reinforcement.

The distance module 464 includes a prediction module 468 and a cluster analysis module 470. The distance module 464 obtains parameters for determining the distance, such as weighting values for a fitness algorithm and a permitted number of evolutions. In various implementations, an evolution is the selection of random reinforcement distances for each URL of the UI that are then used by the prediction module 468 to predict the success or failure of a single eye tracking experiment. The number of permitted evolutions represents the number of different sets of random reinforcement distances that are generated and used to predict the outcome of different eye tracking experiments.

The distance module 464 compares tracking data in each eye tracking experiment to the shortest path and determines a distance between each sample included in the eye tracking data and a corresponding point on the shortest path. The distance module 464, for each URL of the UI, calculates the median distance between eye tracking samples associated with successful tests and the shortest path. Successful tests include tests in which the user reached the goal in the UI—for example, the user successfully logged in to a web application. The distance module 464, for each URL of the UI, also calculates the median distance between eye tracking samples associated with failed tests and the shortest path. Failed tests include tests in which the user did not reach the goal—for example, the user was unable to log in to the web application. Failed tests may also include tests in which the user reached the goal, but did not follow the shortest path to the goal. For example, although the user may have eventually logged in to the web application, they did not do so in the fewest number of steps possible.

The distance module 464 uses the determined median distances for each URL as upper and lower bounds for generating random reinforcement distances for each URL. For example, the distance module 464 set the lower bound for a URL equal to the median success distance for the URL and set the upper bound for the URL equal to the median failure distance. In some implementations, the distance module 464 may use the Monte Carlo module 442 to generate the random distances.

The prediction module 468 then performs an evolution using the randomly generated reinforcement distances and the first eye tracking experiment. For each sample in the eye tracking experiment, the prediction module 468 determines whether the randomly generated reinforcement distances and the shortest path indicates that the experiment was a success (the user reached the goal) or a failure (the user either did not reach the goal or did not follow the shortest path to the goal). The prediction module 468 then compares the predicted outcome of the experiment with the stored outcome of the experiment. For each evolution, the prediction module 468 outputs the number of times that the correct outcome of the experiment was predicted, the number of times the experiment was incorrectly predicted to be a success, and the number of times the experiment was incorrectly predicted to be a failure. The reinforcement module 460 stores the output of the prediction module 468 after each evolution.

The distance module 464 continues generating random reinforcement distances for each URL and the prediction module 468 performs an evolution using the randomly generated reinforcement distances and a new eye tracking experiment until the maximum number of permitted evolutions has been reached.

In response to performing the maximum number of permitted evolutions, the distance module 464 determines a fitness value for each randomly generated reinforcement distance using the stored outputs of the prediction module 468 and the obtained weighting values. The cluster analysis module 470 then performs a cluster analysis of a plot of each fitness value versus the test distance associated with the fitness value. In some implementations, the cluster analysis module 470 may use the density-based spatial clustering of applications with noise (DB SCAN) algorithm to perform the cluster analysis. In other implementations, the cluster analysis module 470 may use the mean shift technique to perform the cluster analysis. In yet other implementations, the cluster analysis module 470 may use another suitable cluster analysis technique or algorithm to analyze the plot of fitness values versus randomly generated distances.

In response to determining that the cluster analysis module 470 identified a single cluster of fitness values versus reinforcement distances for each URL of the UI, the distance module 464 outputs a reinforcement distance for each URL. For each URL, the distance module 464 outputs the reinforcement distance associated with the URL with the highest fitness value.

In response to determining that the cluster analysis module 470 did not identify a single cluster of fitness values versus reinforcement distances for each URL, the distance module 464 sets new upper and lower bounds for each URL. For each URL, the distance module 464 sets the upper bound to the largest distance in the most successful cluster associated with the URL and sets the lower bound to the smallest distance in the most successful cluster. The most successful cluster is the cluster that includes the largest number of data points.

The distance module 464 resets the number of performed evolutions to zero. The distance module 464 then begins generating random reinforcement distances for each URL using the new upper and lower bounds and the prediction module 468 performs evolutions using the randomly generated reinforcement distances until the maximum number of permitted evolutions has been reached.

The distance module 464 determines fitness values for the newly generated random reinforcement distances based on the output of the prediction module 468. The cluster analysis module 470 then analyzes the new fitness values. The process continues in this manner until the distance module 464 outputs a reinforcement distance for each URL.

The step analysis module 466 determines, based on the reinforcement distance for each URL, the number of times that the eye tracking experiments indicate that a user deviated from a step of the shortest path. For example, the step analysis module 466 compares each sample included in an eye tracking experiment to an associated step in the shortest path and determines, based on the reinforcement distance for the URL associated with the shortest path step, whether the sample indicates that the user deviated from the shortest path step.

The prompt generation module 462 generates prompts for each step of the shortest path. The prompts may be used to aide a user of the UI in completing the step. The prompt generation module 462 generates the prompts based on the action included in the step of the shortest path. For example, the prompt generation module 462 may generate a prompt instructing a user to click on a link included in a shortest path step. As another example, the prompt generation module 462 may instruct the user to enter text into a data entry field—for example, typing in a username.

The prompt generation module 462 may use a DOM element that corresponds to the action included in the shortest path step to generate a prompt. In some implementations, the prompt generation module 462 includes details of the interactive element of the UI obtained from the DOM element—for example, the name of or text associated with the element—in the generated prompt. The prompt generation module 462 may use the headless browser 426 to obtain the DOM element.

The UI enhancement module 422 determines if the step requires reinforcement based on the reinforcement percentage and the results of the step analysis module 466. For example, the UI enhancement module 422 calculates a ratio of the number of times an eye tracking sample indicated that the user deviated from the shortest path step and the total number of eye tracking samples associated with the step. The UI enhancement module 422 determines that the step requires reinforcement in response to determining that the calculated ratio is equal to or greater than the reinforcement percentage.

In response to determining that a step of the shortest path requires reinforcement, the UI enhancement module 422 generates a reinforcement for the step. In some implementations, the reinforcement may include an additional prompt that includes more information about the action to be executed by the user. For example, the additional prompt may inform the user of the location of the interactive element on the screen. In other implementations, the reinforcement may include instructions to highlight the interactive element. In yet other implementations, the reinforcement may include both the additional prompt and the highlighting instructions. The UI enhancement module 422 stores the generated prompts and reinforcements, along with the shortest path. For example, the UI enhancement module 422 may store the information in the storage device 412.

In various implementations, the shortest path generated by the shortest path module 420 and the prompts and reinforcements generated by the UI enhancement module 422 may be used to alter the UI to improve the usability of the UI and the associated application. For example, interactive elements of the UI—such as links, buttons, and data entry fields—may be repositioned, either automatically or manually, to reduce the total distance required to reach a goal. The UI testing and enhancement device 410 may then perform additional tests on the altered UI. For example, the shortest path module 420 may generate a new shortest path for the altered UI to determine if the repositioned elements improved the UI—in other words, whether total distance of the shortest path was reduced.

Additionally, new eye tracking experiments may be performed on a UI that incorporates the generated UI enhancements. The UI enhancement module 422 may use the data from the new eye tracking experiments to determine if the enhancements improved the usability of the UI. For example, the UI enhancement module 422 may determine that UI enhancements resulted in an overall reduction in the deviation from the shortest path—that is, fewer steps of the shortest path require reinforcement.

AI Network

Figure 5:
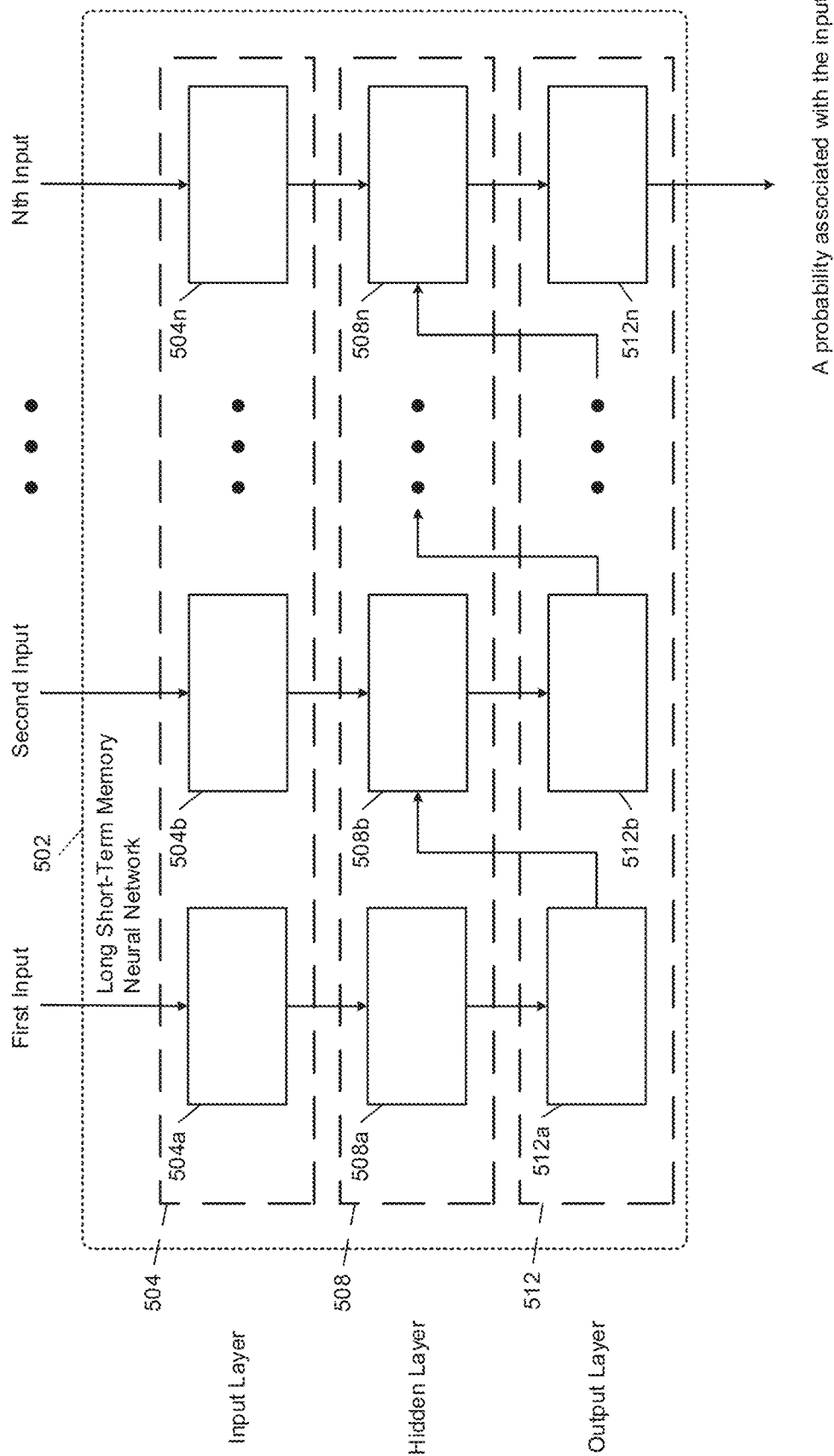
FIG. 5 is a functional block diagram of an example long short-term memory neural network.

In various implementations, the link neural network 448, the submit neural network 450, the data choice neural network 454, and the action weight neural network 456 may be implemented as long short-term memory (LSTM) neural networks. LSTM neural networks are feedforward neural networks. FIG. 5 is a functional block diagram of a generic example LSTM neural network 502. The LSTM neural network 502 includes an input layer 504, a hidden layer 508, and an output layer 512. The input layer 504 includes inputs 504a, 504b . . . 504n. The hidden layer 508 includes neurons 508a, 508b . . . 508n. The output layer 512 includes outputs 512a, 512b . . . 512n.

Each neuron of the hidden layer 508 receives an input from the input layer 504 and outputs a value to the corresponding output in the output layer 512. For example, the neuron 508a receives an input from the input 504a and outputs a value to the output 512a. Each neuron, other than the neuron 508a, also receives a output of a previous neuron as an input. For example, the neuron 508b receives inputs from the input 504b and the output 512a. In this way the output of each neuron is fed forward to the next neuron in the hidden layer 508. The last output 512n in the output layer 512 outputs a probability associated with the inputs 504a-504n. Although the input layer 504, the hidden layer 508, and the output layer 512 are depicted as each including three elements, each layer may contain any number of elements.

In various implementations, each layer of the LSTM neural network 502 must include the same number of elements as each of the other layers of the LSTM neural network 502. For example, name and location of a link, a submit action type, a text data entry field, etc. may be parsed to create inputs for the inputs 504a-504n. The output of the LSTM neural network 502 may represent a probability that execution of the inputted link, a submit action type, a text data entry field, etc. will result in the goal.

In some embodiments, a convolutional neural network may be implemented. Similar to LSTM neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 504*a* is connected to each of hidden layer 508*a*, 508*b* . . . 508*n*.

Shortest Path Determination

Figure 6A:
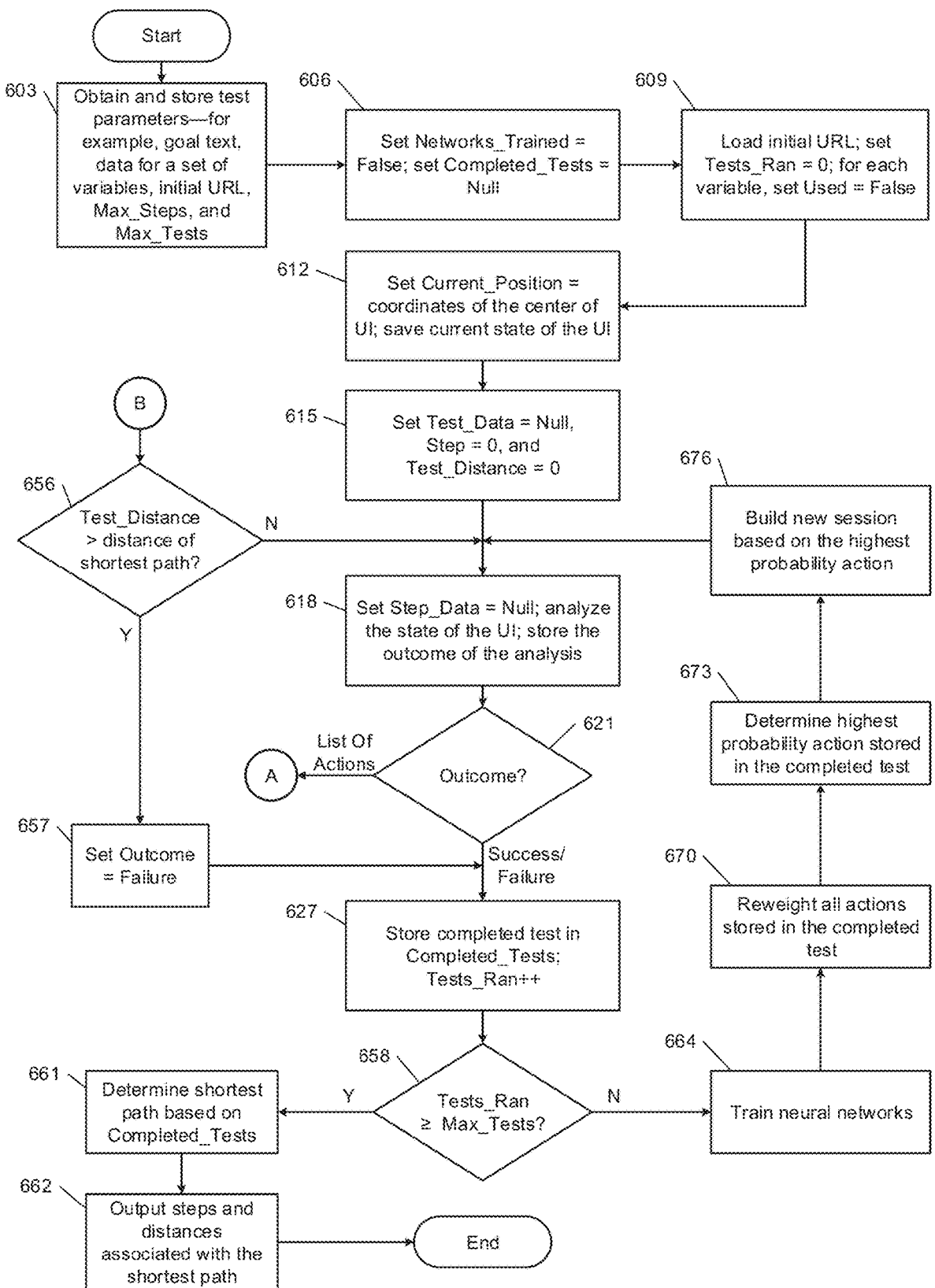
FIGS. 6A and 6B together are a flowchart depicting an example method of determining a shortest path to a given goal in a UI.
Figure 6B:
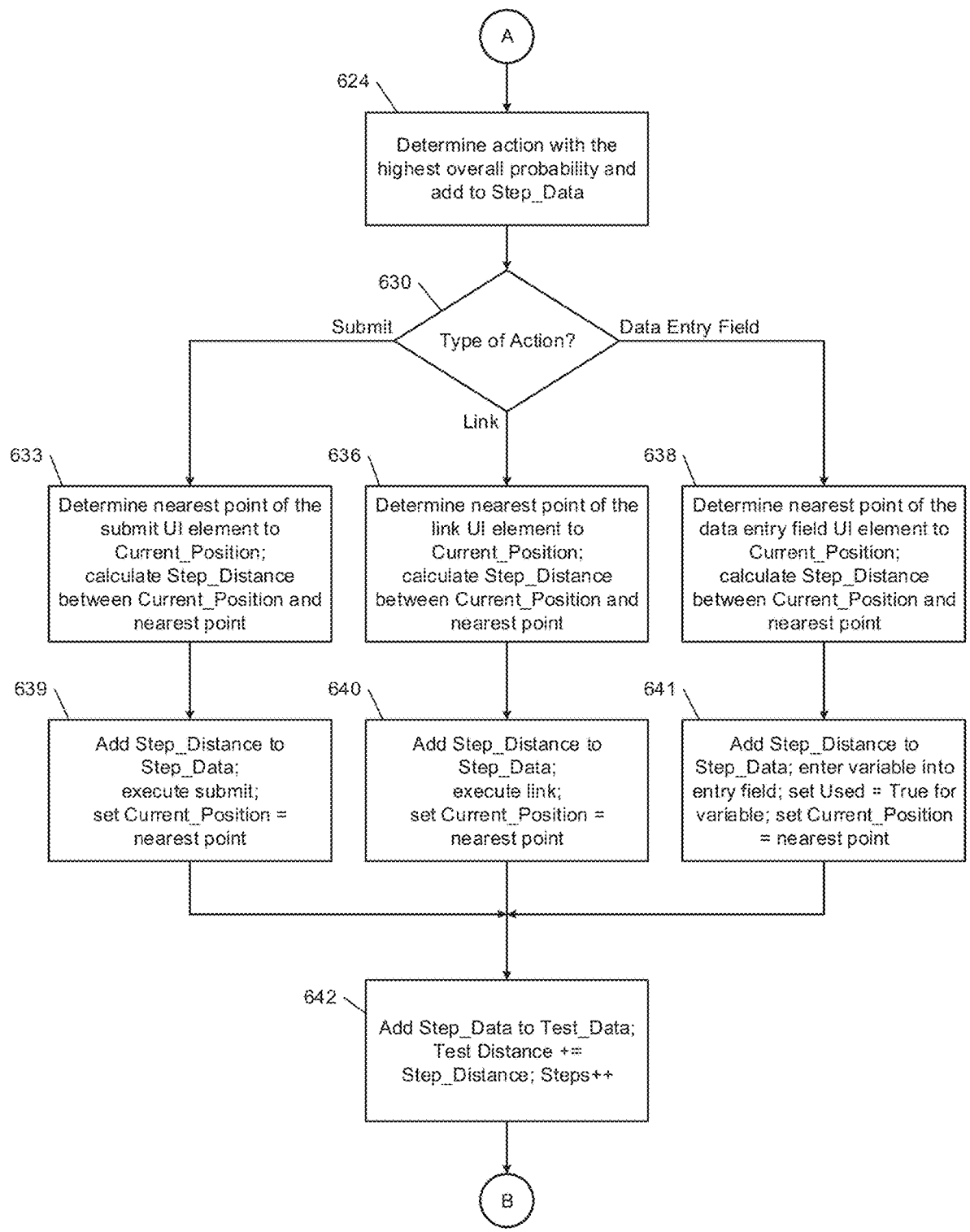

FIGS. 6A and 6B together are a flowchart depicting an example method of determining a shortest path to a given goal in a UI. Although the example method is described below with respect to the UI testing and enhancement device 410, the method may be implemented in other devices and/or systems. In various implementations, control may be performed by the shortest path module 420.

In FIG. 6A, control begins at 603, where control obtains test parameters. Example test parameters include: goal text, data for a set of variables, an initial URL of a UI to be tested, a maximum number of permitted steps per test, and a maximum number of permitted tests. Control then stores the test parameters as test configuration data. For example, control may store the test configuration data in the storage device 412. Control continues with 606, where control initializes values associated with the tests. For example, control sets the training status of the neural networks (Networks_Trained) to false and Completed_Tests to Null. Control then continues with 609, where control loads the initial URL and sets the number of executed tests (Tests_Ran) to zero.

At 609, control, for each variable in the stored configuration data, sets a used status flag (Used) to false. Control then continues with 612, where control sets the current position (Current_Position) to the center of the UI. At 612, control also stores the result of loading the initial URL, which is the current state of the UI, as Initial_State. Control then continues at 615, where control initializes the data associated with the first test: for example, control sets Test_Data to Null, Step to zero, and Test_Distance to zero. Control then progresses to 618.

At 618, control initializes the data associated with the current step—for example, control sets Step_Data to Null. Control then analyzes the current state of the UI. The outcome of the analysis may be Success, Failure, or a list of actions. Success indicates that the current state of the UI includes the goal text or satisfies some other goal criteria. Failure may indicate that the current state includes neither the goal text nor any possible actions—such as traversing links, entering data into a data entry field, or submitting data that has been entered into a data entry field. Failure may instead indicate that the test has performed the maximum number of permitted steps and has not reached the goal.

A list of actions indicates that the current state includes at least one possible action that may be executed. Each action in the list of actions includes a probability that the action will result in reaching the goal. Control then stores the results of the analysis. For example, control adds the outcome of success or failure to Test_Data and an outcome of the list of actions to Step_Data. Control then progresses to 621, where control determines whether the outcome of the analysis is the list of actions or a Success or Failure indicator. If the outcome is the list of actions, control progresses to 624 of FIG. 6B; otherwise, control transfers to 627.

At 624 of FIG. 6B, control determines an action to execute. For example, control selects the action with the highest overall probability among the list of actions. Control may use equations 1 and 2 below to determine the overall Probability for each action.

$$P_{distance\_weighted} = \begin{cases} P_{action}, & \text{Test\_Distance} = 0 \quad (1) \\ P_{action} * \left(\dfrac{\text{Test\_Distance}}{\text{Action\_Distance}}\right), & \text{Test\_Distance} > 0 \end{cases}$$

$$P_{overall} = \dfrac{P_{weighted}}{\Sigma P_{distance\_weighted}} \quad (2)$$

$P_{action}$ is the probability of an action being performed. Action Distance is the Euclidean distance between the current position and the nearest point of the UI element associated with the action. Test_Distance is the total distance traveled in the UI during the current test. $\Sigma P_{distance\_weighted}$ is a summation of $P_{distance\_weighted}$ for each action in the list of actions.

Control then progresses to 630 where control determines whether the selected action is a submit, a link, or an entry. In response to determining that the selected action is a submit, control progresses to 633. In response to determining that the selected action is a link, control progresses to 645; otherwise, control progresses to 648.

At 633, control determines a point of the UI element associated with the submit that is nearest to the current position (Current_Position). In various implementations, the coordinates of the nearest point are obtained from the list of actions for the selected action. Control then calculates the step distance (Step_Distance) as the Euclidean distance between Current_Position and the nearest point. Control then continues with 639, where control stores the step distance and executes the submit—for example, control adds Step_Distance to Step_Data and triggers a click on the UI element associated with the submit. At 639, control also updates Current_Position to the coordinates of the nearest point.

Returning to 636, control determines the point of the UI element associated with the link that is nearest to Current_Position. The coordinates may be stored in the list of actions for the selected action. Control then sets Step_Distance to the Euclidean distance between Current_Position and the nearest point. Control then continues with 640, where control stores the step distance and executes the link—for example, adds Step_Distance to Step_Data and triggers a click on the UI element associated with the link. At 640, control also sets Current_Position to the nearest point of the UI element associated with the link. For example, control may set Current_Position to the coordinates stored in the list of actions for the selected action. Control then progresses to 642.

Returning to 638, control determines the point of the UI element associated with the entry that is nearest to Current_Position. For example, the coordinates stored in the list of actions for the selected action. Control then sets Step_Distance to the Euclidean distance between Current_Position and the nearest point of the UI element associated with the entry. Control then continues with 641 where control stores the step distance and executes the entry—for example, adds Step_Distance to Step_Data and enters the variable associated with the action into the data entry field. At 641, control also marks the variable entered into the data entry field as used and sets Current_Position to the nearest point of the UI element associated with the entry. For example, control may set Used for the variable to True and Current_Position to the coordinates stored in the list of actions for the selected action. Control then progresses to 642.

At 642, control stores the progress of the current test—for example, control adds Step_Data to Test_Data, adds Step_Distance to Test_Distance, and increases the number of steps taken by 1. Control then continues with 656 of FIG. 6A.

Returning to FIG. 6A, at 656 control determines whether the current test distance is longer than an already determined path—in other words, whether the distance of the current test is longer than the shortest successfully completed test. If so, control progresses to 657; otherwise control returns to 618. At 657, control sets the status of the current test to Failure. For example, control sets Outcome equal to Failure. Control then continues with 627.

At 627, control stores the current test as a completed test. For example, control adds the total distance of the test (Test_Distance) and the data associated with the current test (Test_Data) to Completed_Tests. At 627, control increments Tests_Ran by one. Control progresses to 658 where control determines whether the number of tests that have been run (Tests_Ran) is equal to or greater than the number of permitted tests (Max_Tests). If so, control progresses to 661; otherwise control transfers to 664.

At 661, control determines a shortest path to the goal based on ompleted_Tests. For example, control selects a successful test stored in Completed_Tests with the smallest Test_Distance as the shortest path. Control progresses to 662, where control outputs the stored data associated with Test_Data as the shortest path. Control then ends.

Returning to 664, control trains the neural networks. Control then progresses to 670 where control reweights the probabilities associated with the actions of each step of the completed test. Control then continues with 673, where control selects the action associated with the completed test that has the highest overall probability of resulting in the goal (such as arriving at a page or state containing the desired text). Control may use equations 1 and 2, as previously described, to determine the overall probability of each action. Control then progresses to 676, where control builds a new session based on the selected action. Control then returns to 615 of FIG. 6A where control waits for the next test.

Figure 7A:
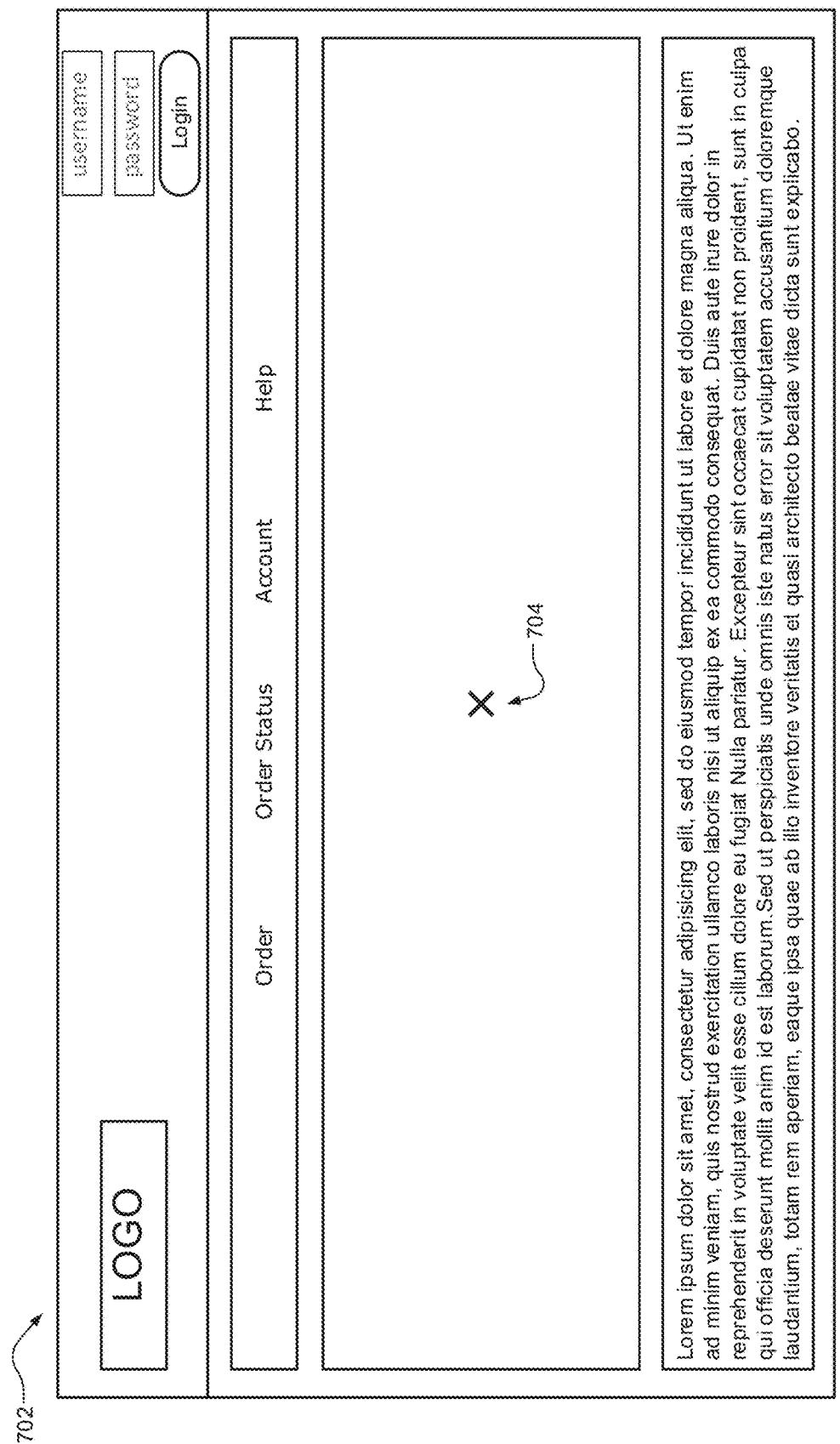
FIGS. 7A-7H are graphical representations of determining a shortest path to a goal in a specific example UI.

FIGS. 7A-7H are graphical representations of a process of determining a path to a goal in an example UI. Specifically, FIGS. 7A-7H depict an example process of determining a path to complete a login process in the example UI. FIG. 7A is a rendering of an initial state 702 of the example UI. The process begins by setting the current position to the center of the screen 704. Next, the initial state 702 of the UI is analyzed.

Figure 7B:
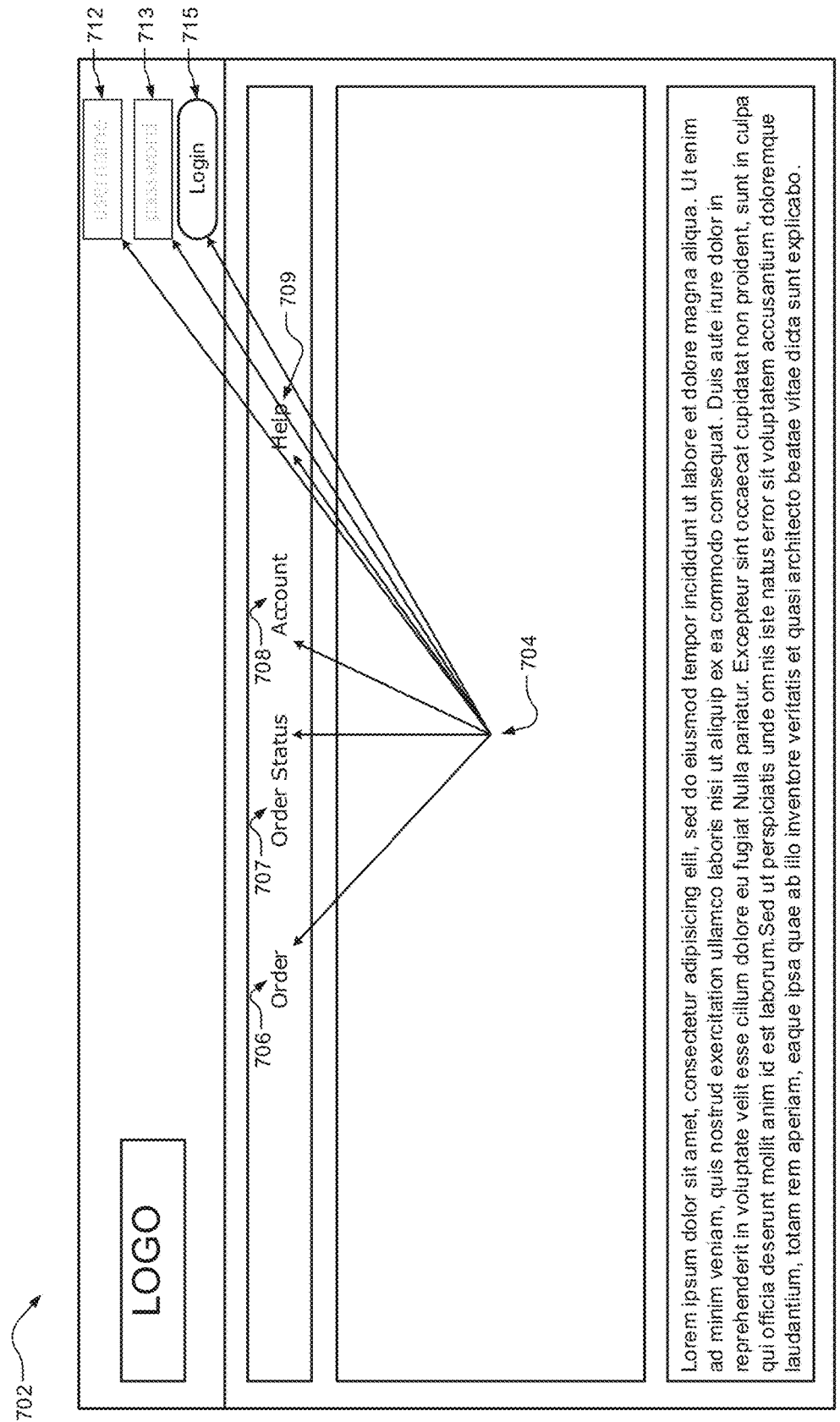

FIG. 7B is a graphical representation of the results of the analysis of the initial state 702 of the UI: for example, an identification of all of the possible actions that may be taken in the initial state 702 of the UI. Specifically, the analysis identifies a first link 706, a second link 707, a third link 708, and a fourth link 709. The analysis also identifies a first data entry field 712, a second data entry field 713, and a submit button 715 (labeled "Login"). The arrows emanating from the center of the screen 704 represent the distance from the current position to each identified action in the initial state 702.

Figure 7C:
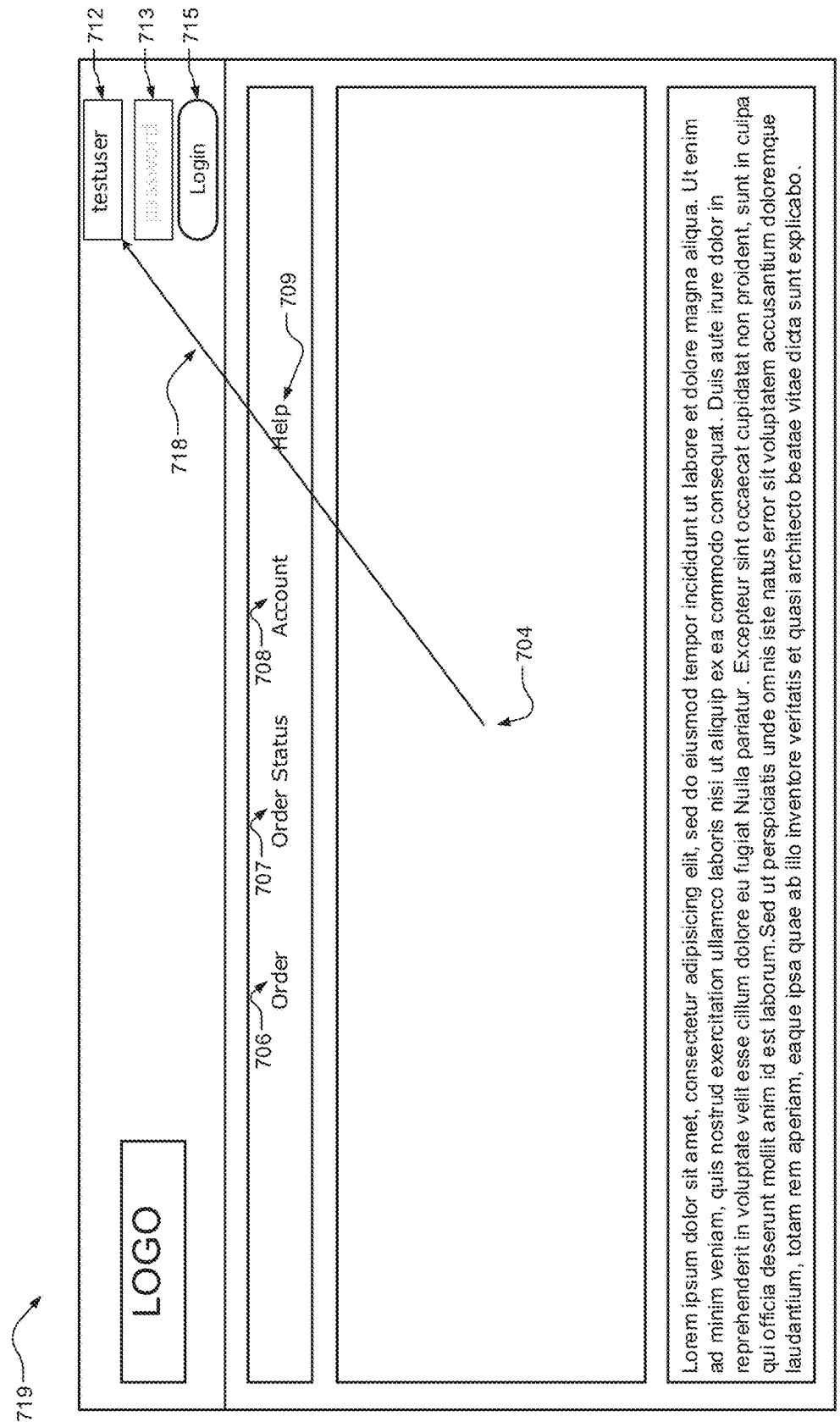

In FIG. 7C, the action selected as the first step in the shortest path is entering the text "testuser" into the first data entry field 712. This selection may be made, as described above, based on weighted probabilities from trained neural networks of FIG. 6B. The distance between the current position—the center of the screen—and the location of the first data entry field is a first step distance 718 that is stored as the distance of the shortest path. Performing the selected action results in the UI transitioning from the initial state 702 to a second state 719 and changing the current position to the location of the first data entry field 712. Next, the second state 719 of the UI is analyzed.

Figure 7D:
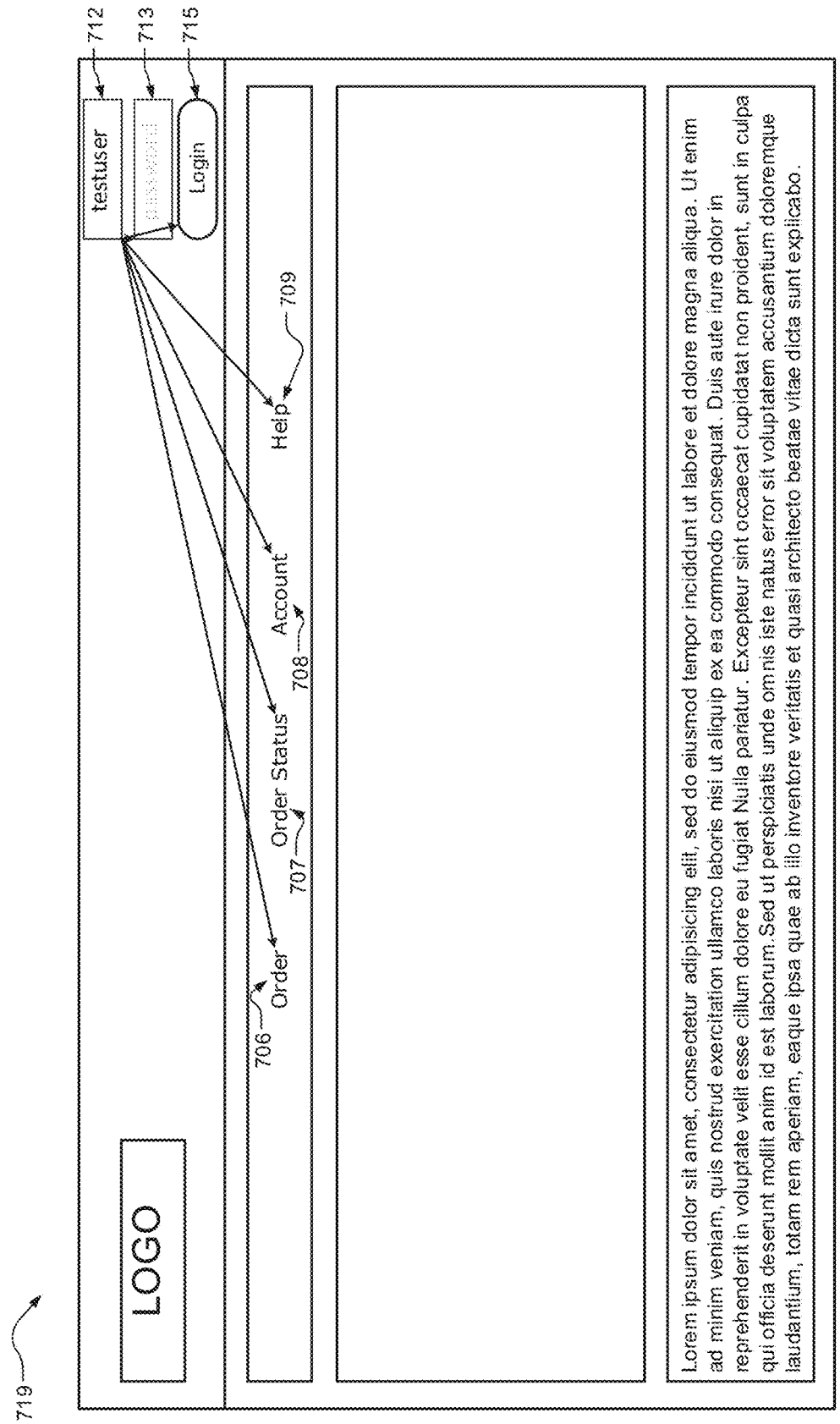

FIG. 7D is a graphical representation of the results of an analysis of possible actions that may be taken in the second state 719 of the UI. Specifically, the analysis identifies the first link 706, the second link 707, the third link 708, the fourth link 709, the second data entry field 713, and the submit button 715 as possible actions for the second step. The arrows emanating from the first data entry field 712 represent the distance from the current position to each possible action in the second state 719 of the UI.

Figure 7E:
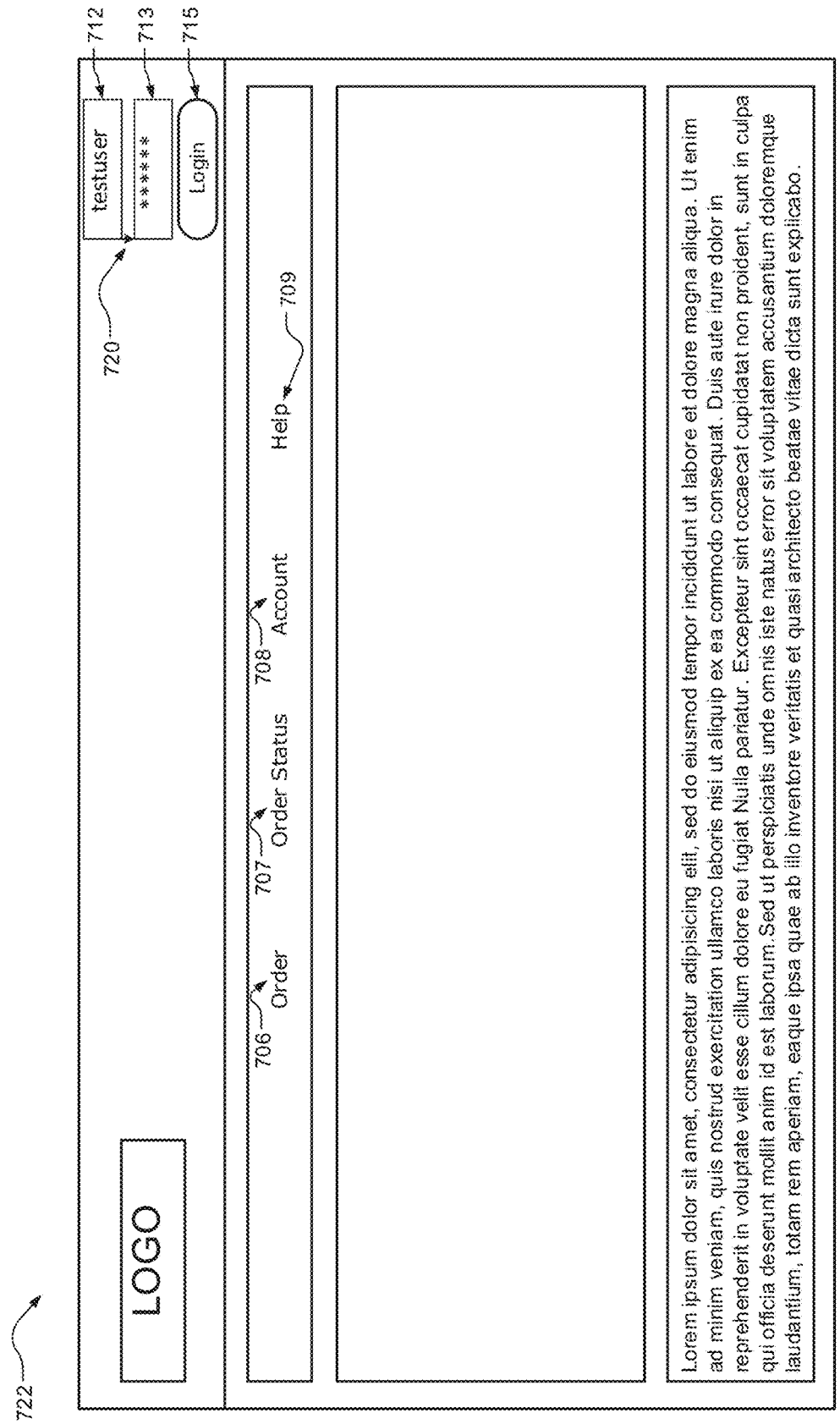

In FIG. 7E, the action selected as the second step is entering text into the second data entry field 713—represented as "****". The distance between the current position—the location of the first data entry field 712—and the location of the second data entry field 713 is a second step distance 720 that is added to the stored current path distance. Performing the selected action in the second state 719 results in the UI transitioning to a third state 722 and changing the current position to the location of the second data entry field 713. Next, the third state 722** of the UI is analyzed.

Figure 7F:
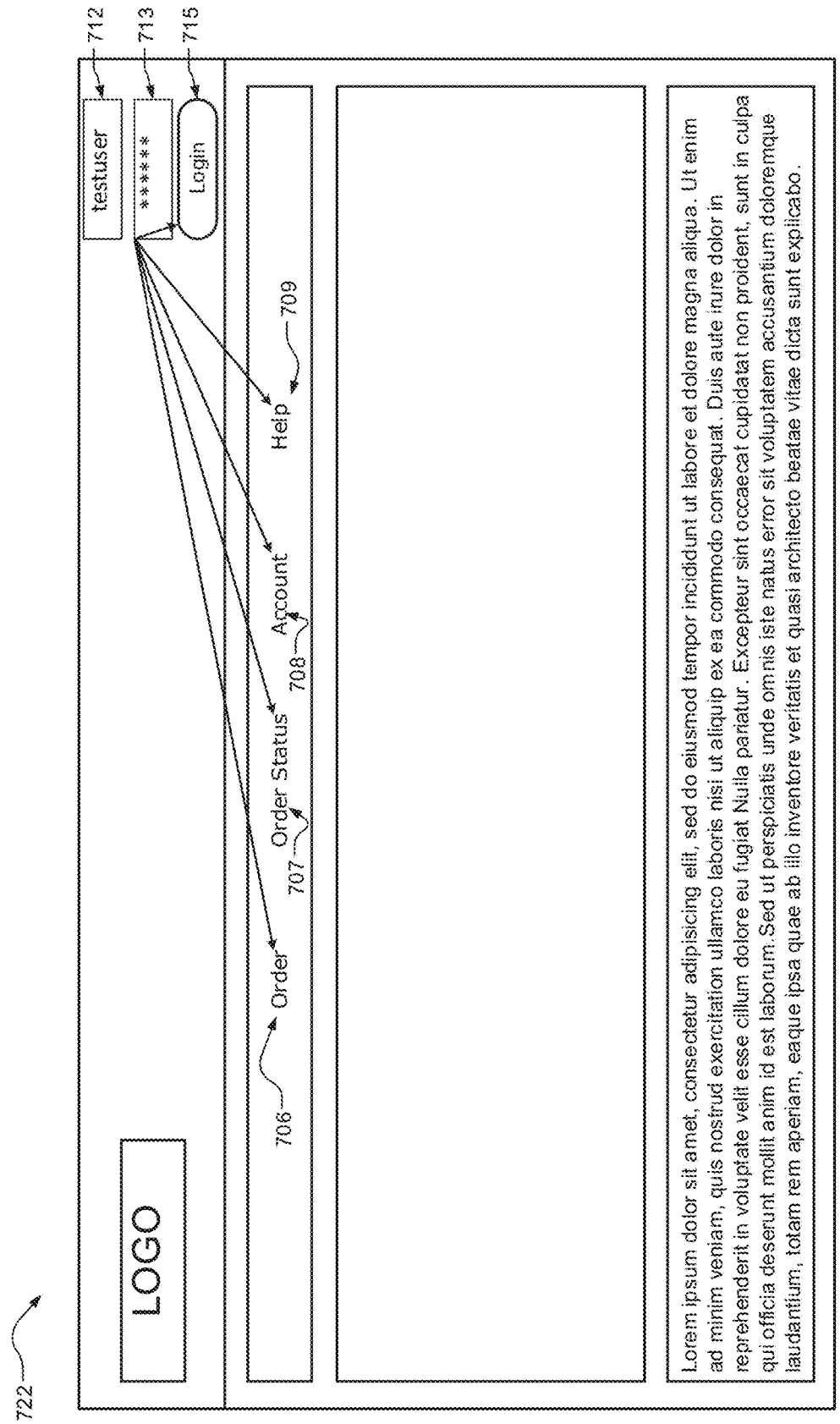

FIG. 7F is a graphical representation of the results of an analysis of the third state 722 of the UI—in other words, all of the possible actions that may be taken in the third state 722 of the UI. Specifically, the analysis identifies the first link 706, the second link 707, the third link 708, the fourth link 709, and the submit button 715 as possible actions for the third step of the shortest path. The arrows emanating from the second data entry field 713 represent the distance from the current position to each identified action in the third state 722.

Figure 7G:
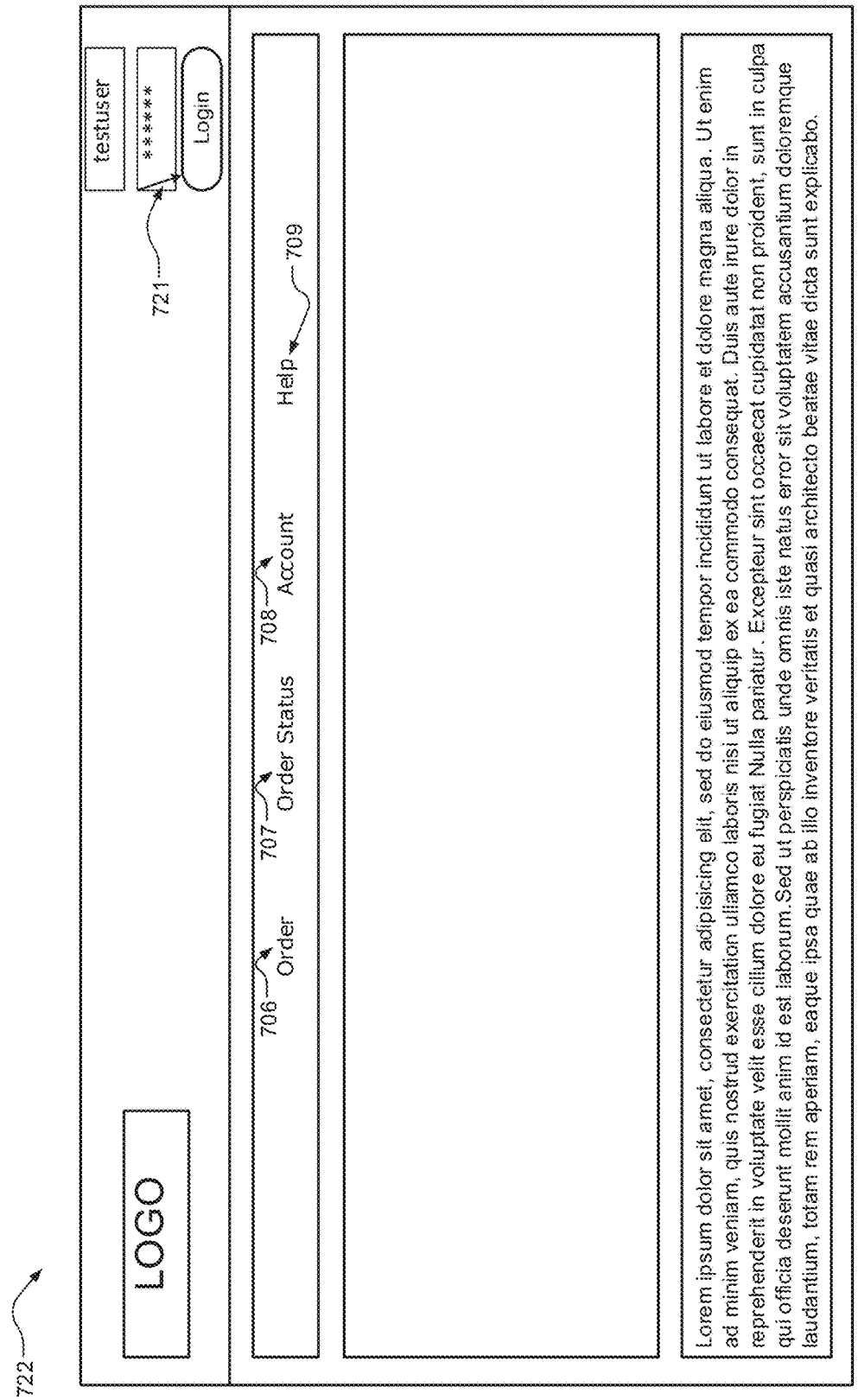

In FIG. 7G, the action selected as the third step is clicking the submit button 715. The distance between the current position—the location of the second data entry field 713—and the location of the submit button 715 is a third step distance 724 that is added to the stored current path distance. Performing the selected action in the third state 722 results in the UI transitioning to a fourth state 726 shown in FIG. 7H and changing the current position to the location of the submit button 715.

Figure 7H:
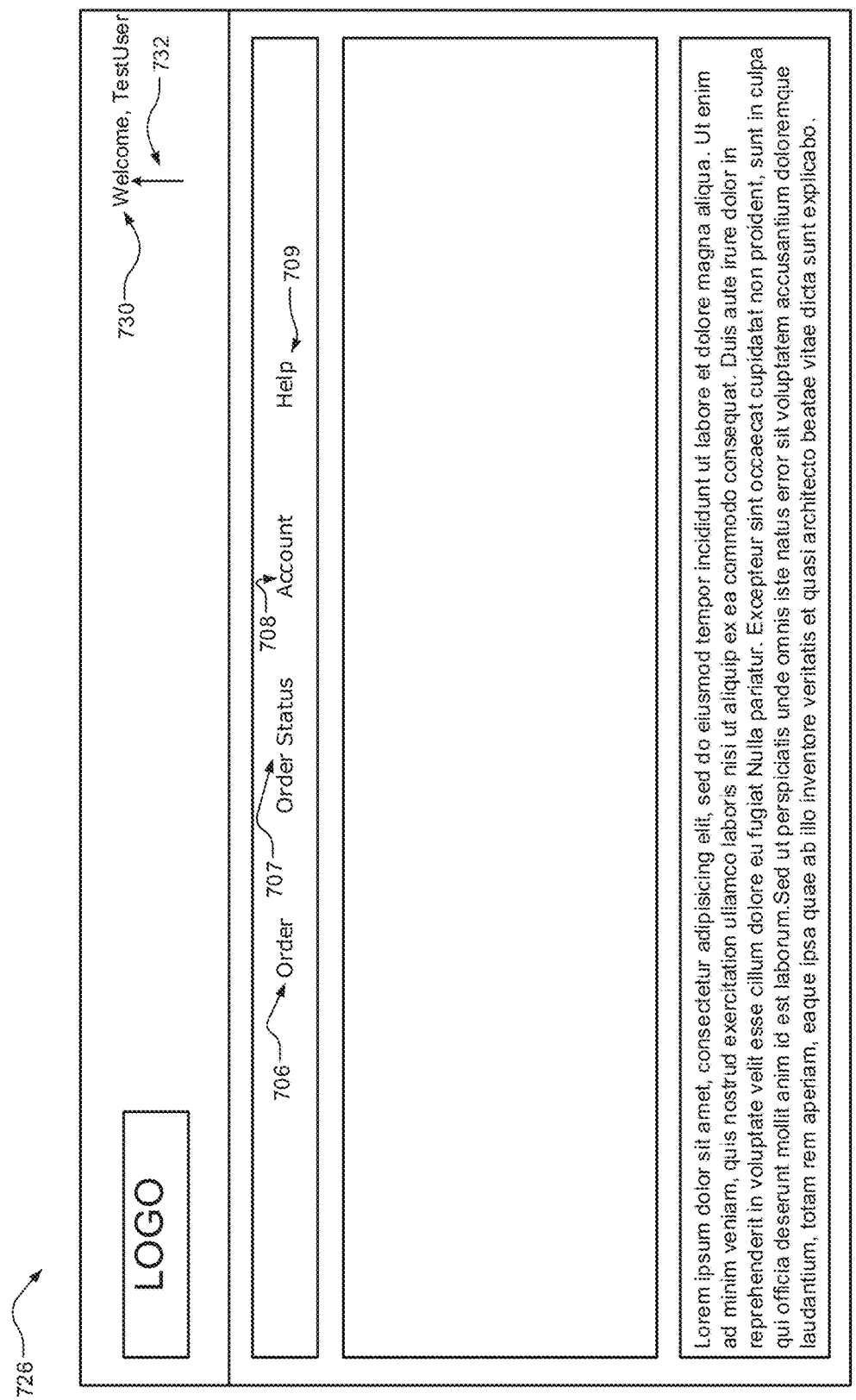

As shown in FIG. 7H, an analysis of the fourth state 726 of the UI results in the identification of text 730. The text 730 matches the goal text (for example, "Welcome"), which indicates that the goal has been reached. The distance from the current position—the former location of the submit button 715 labeled "Login"—to the location of the text 730 is a fourth step distance 732 that is added to the current path distance to determine the total distance of the current path. This path led to a successful outcome. Additional paths may be investigates to determine whether a successful path with a shorter total distance can be found.

Further details regarding determination of a shortest path to a given goal in a UI may be found in U.S. patent application Ser. No. 16/196,321, filed on Nov. 20, 2018, the entire disclosure is incorporated by reference.

Preferred Path Determination

Figure 8:
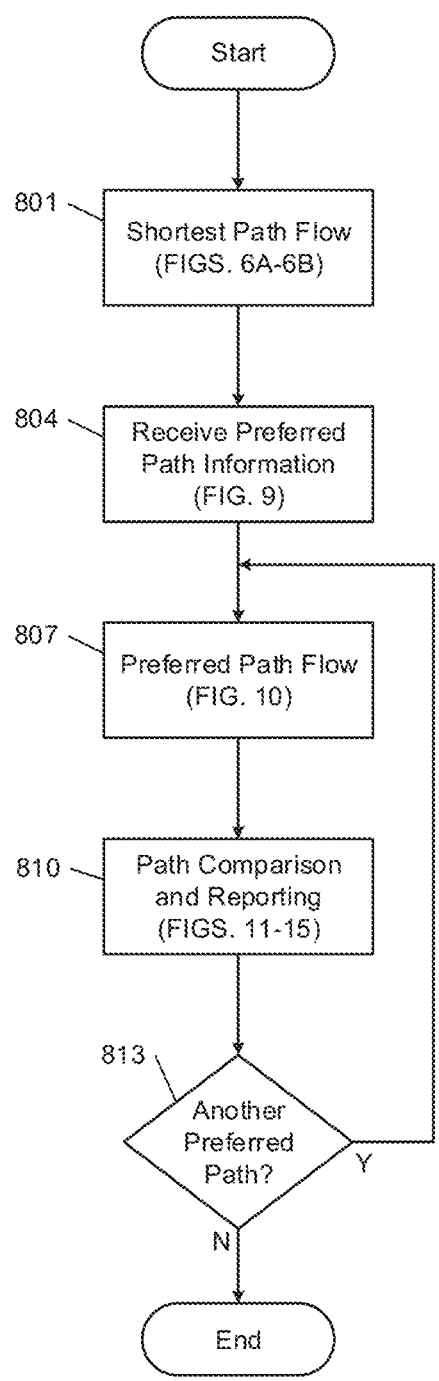
FIG. 8 is a flowchart depicting an example method of comparing a shortest path to a given goal in a UI to one or more preferred paths to the given goal in the UI.

FIG. 8 is a flowchart depicting an example method of comparing a shortest path to a given goal in a UI to one or more preferred paths to the given goal in the UI. Although the method is described below with respect to the UI testing and enhancement device 410, the method may be implemented in other devices and/or systems. In various implementations, control may be performed by the path module 420 and/or the analysis module 432 of FIG. 4.

Control begins at 801, where control determines a shortest path to a given goal in a UI. For example, control may perform the method disclosed in FIGS. 6A and 6B. The outcome of the method may be the shortest path to the given goal in the UI, which may include a shortest Euclidian distance, etc., as described above. The shortest path may be stored in the storage device 412, etc.

Control then progresses to 804, where preferred path information is received, related to a preferred path to the given goal in the UI. For example, control may perform the method disclosed in FIG. 9. As described further below, the preferred path information may be received via one or more of various preferred path input types, including but not limited to entry of a full preferred path, entry of menu element weights, retrieval of a stored configuration details (e.g., from the storage device 412 of FIG. 4), etc.

Control continues at 807, where control implements a preferred path flow method to generate the full preferred path to the given goal in the UI, for comparison with the stored shortest path. For example, control may perform the method disclosed in FIG. 10. As described below, a full preferred path may be generated based on the received preferred path information (e.g., menu element weights, stored configuration details, etc.) for comparison of the full preferred path to the stored shortest path.

Control then progresses to 810, where the shortest path to the given goal in the UI is compared to the preferred path to the given goal in the UI. As described below, the comparison is analyzed via one or more scoring algorithms, graphical visualizations, etc., and results of the comparison/analysis may be provided to a user. Example scoring algorithms, graphical visualizations, etc., are illustrated in FIGS. 11-15. For example, a developer may use the comparison results to enhance the UI by adjusting positioning of UI elements to more closely align the preferred path with the shortest path, etc.

At 813, control determines whether any additional preferred paths have been received, stored, etc. for comparison with the stored shortest path. If so, control returns to 807 to generate/load a next full preferred path for comparison with the shortest path and analysis/reporting at 810. If there are no additional preferred paths, control ends at 813.

Figure 9:
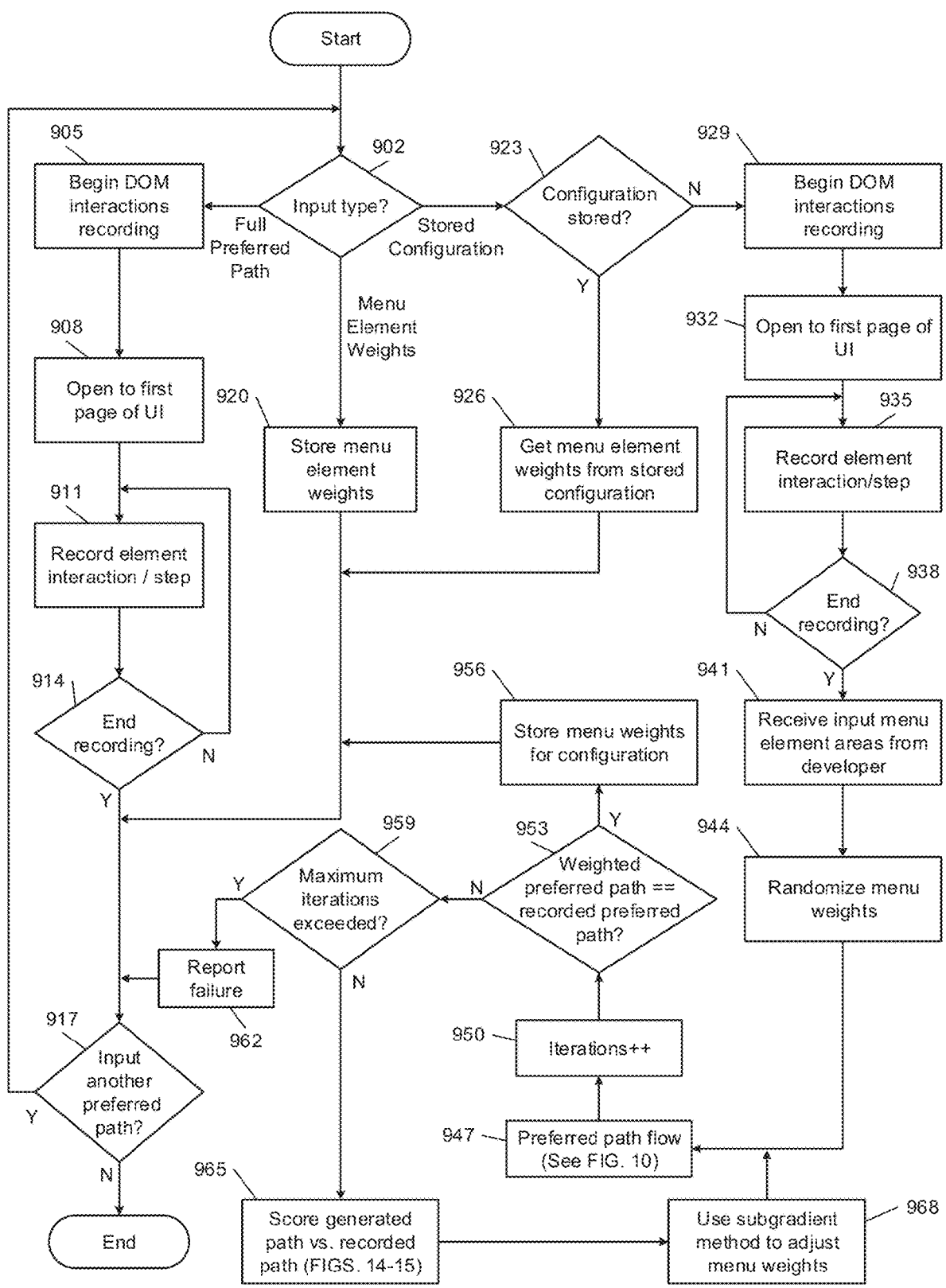
FIG. 9 is a flowchart depicting an example method of receiving information regarding a preferred path to a goal in a UI.

FIG. 9 is a flowchart depicting an example method of receiving information regarding a preferred path to a given goal in a UI. Although the example method is described below with respect to the UI testing and enhancement device 410, the method may be implemented in other devices and/or systems. In various implementations, control may be performed by the path module 420 and/or the analysis module 432.

Control begins at 902, where control determines the type of input from which the preferred path information will be received (for example, a user may designate how they would like to supply the preferred path information, etc.). If the input type is a full preferred path, control proceeds to 905 to begin a document object model (DOM) interaction recording.

Upon beginning the DOM interaction recording, control opens a first page of a UI (e.g., a first displayed page of a website, etc.) at 908. Control then records an element interaction or step at 911. For example, as a developer interacts with the UI by selecting buttons or links, entering text in data entry fields, etc., each interaction may be recorded to define the preferred path (e.g., saved to the storage device 412, etc.). The developer may implement a series of actions to reach a given goal in the UI in an order, manner, etc. that a user of the UI may be expected to implement, in an order that the developer believes would provide increased usability of the UI, in an order may be most intuitive to a user of the UI, etc. The series of actions may then be recorded to define the preferred path.

As an example, when the developer interacts with a link, button, data entry field, etc., at 911, control may obtain the DOM element that corresponds to the selected link, button, data entry field, etc. Control may determine, based on the obtained DOM element, whether the type of link, button, data entry field, etc. that the user interacted with. While recording the element interaction at 911, control may obtain the name of, or text associated with, a selected DOM element, may obtain a location of the DOM element or the UI component associated with the DOM element, etc.

At 914, control determines whether to end the recording. For example, the developer may enter a command, select an end recording button, etc. to stop recording element interactions or steps when the developer is finished entering the preferred path (e.g., when the developer has reached the goal in the UI). If the recording is ended, control proceeds to 917 to determine whether any additional preferred paths will be input. If so, control returns to 902 to receive another input type. If there are not any additional preferred paths at 917, control ends the process.

If the recording has not yet ended at 914 (e.g., because the user is still entering more UI element interactions, has not selected an end recording button, etc.), control may return to 911 to record a next element interaction or step from the developer. In this manner, a series of interactions with the UI may be recorded to define the preferred path to the given goal of the UI.

Returning to 902 of FIG. 9, another input type is menu element weights. For example, a developer may enter specific weights or each menu element of the UI, to be used to define the preferred path to reach the goal in the UI.

When the menu element weights input type is determined at 902, control proceeds to 920 to store the received menu element weights (e.g., in the storage device 412, etc.). Control then determines whether another preferred path will be input at 917.

Returning again to 902, another input type is a stored configuration. For example, a developer may select to enter preferred path information by retrieving a previously stored configuration (e.g., from the storage device 412), or by entering preferred path information to be stored as configuration.

At 923, control determines whether a configuration has already been stored, whether a previously stored configuration has been selected by the developer, etc. If so, control proceeds to 926, where menu element weights are retrieved from the stored configuration.

For example, a stored configuration may include a set of menu weights generated from an initial recorded preferred path. An individual configuration may be considered as a model for an expected type of user, such as a first-time website user or an expert website user. Once the configuration has been generated, the stored configuration may be used to generate a preferred path for the expected type of user at a later time, even after the web site changes so that the recorded path is no longer applicable. After the menu element weights are retrieved at 926 (which may be used to define the preferred path to the goal in the UI), control may then proceed to 917 to determine whether another preferred path will be input.

If control determines at 923 that a configuration is not stored, control begins recording DOM interactions at 929 to be stored as a new configuration. The steps 929, 932, 935 and 938 for the stored configuration input type may be similar to the steps 905, 908, 911 and 914 of the full preferred path input type, but the stored configuration process may further store a configuration of menu weights after the DOM interactions are recorded.

For example, upon beginning the DOM interaction recording at 929, control opens a first page of a UI (for example, a first displayed page of a web site, etc.) at 932. Control then records an element interaction or step at 935. For example, as a developer interacts with the UI by selecting buttons or links, entering text in data entry fields, etc., each interaction may be recorded to define the preferred path (e.g., saved to the storage device 412, etc.). The developer may implement a series of actions to reach a given goal in the UI in an order, manner, etc. that a user of the UI may be expected to implement, in an order that the developer believes would provide increased usability of the UI, in an order may be most intuitive to a user of the UI, etc. The series of actions may then be recorded to define the preferred path.

As an example, when the developer interacts with a link, button, data entry field, etc., at 935, control may obtain the DOM element that corresponds to the selected link, button, data entry field, etc. Control may determine, based on the obtained DOM element, whether the type of link, button, data entry field, etc. that the user interacted with. While recording the element interaction at 911, control may obtain the name of, or text associated with, a selected DOM element, may obtain a location of the DOM element or the UI component associated with the DOM element, etc.

At 938, control determines whether to end the recording. If the recording has not yet ended (e.g., because the user is still entering more UI element interactions, has not selected an end recording button, etc.), control may return to 935 to record a next element interaction or step from the developer. In this manner, a series of interactions with the UI may be recorded to define the preferred path to the given goal of the UI.

In order to end the recording at 938, the developer may enter a command, select an end recording button, etc. to stop recording element interactions or steps when the developer is finished entering the preferred path (such as when the developer has reached the goal in the UI). If the recording ends, control proceeds to 941 to receive input menu element areas from the developer.

For example, the developer may identify, select, highlight, define, etc., menu element areas on one or more pages of the UI. The menu element areas may include links, buttons, data entry fields, etc. for navigating the one or more pages of the UI to reach the given goal of the UI. The developer may provide the menu input menu element areas by clicking on DOM objects in the UI page(s), entering location information for the menu element areas, etc.

After receiving the input menu element areas from the developer, control then proceeds to 944 to randomize menu weights. For example, the menu weighs could be randomized according to any suitable random distribution, such as a uniform distribution of weights between 100% and 200%], a normal distribution of weights centered at 200% with a standard deviation of less than 100%, etc.

Control then proceeds to 947, where control implements a preferred path flow method to generate a weighted full preferred path with tuned menu weights. For example, control may perform the method disclosed in FIG. 10. Next, control increments an iteration count at 950, and then determines whether the weighted preferred path is substantially similar as the recorded preferred path (such as from 929, 932, 935 and 938).

If the weighted preferred path is substantially similar (e.g., identical, within a specified threshold, etc.) as the recorded preferred path at 953, control stores the menu weights at 956 as a preferred path stored configuration, then returns to 917 to determine whether another preferred path will be input.

Otherwise, if the weighted preferred path is not substantially similar to the recorded preferred path at 953, control proceeds to 959. At 959, control determines whether a maximum number of iterations has been exceeded. For example, the incremented iterations count from 950 may be compared to a maximum iteration threshold (for example, three iterations, ten iterations, one hundred iterations, etc.). When the incremented iterations count exceeds the maximum iteration threshold, control may report a failure at 962 and control then returns to 917 to determine whether another preferred path will be input.

If the maximum iterations threshold is not yet exceeded at 959, control proceeds to 965 to score the generated preferred path (such as, from 947) versus the recorded preferred path (such as, from 929, 932, 935 and 938). Example scoring algorithms are illustrated in FIGS. 14 and 15, although other suitable scoring algorithms may be used in other embodiments.

After scoring the generated preferred path versus the recorded preferred path at 965, control proceed to 968 to adjust menu weights using a sub-gradient method. The sub-gradient method may include optimization of non-differentiable, convex functions. After adjusting the menu weights, control proceeds back to 947 to implement the preferred path flow to generate a weighted full preferred path with the adjusted menu weights.

Figure 10:
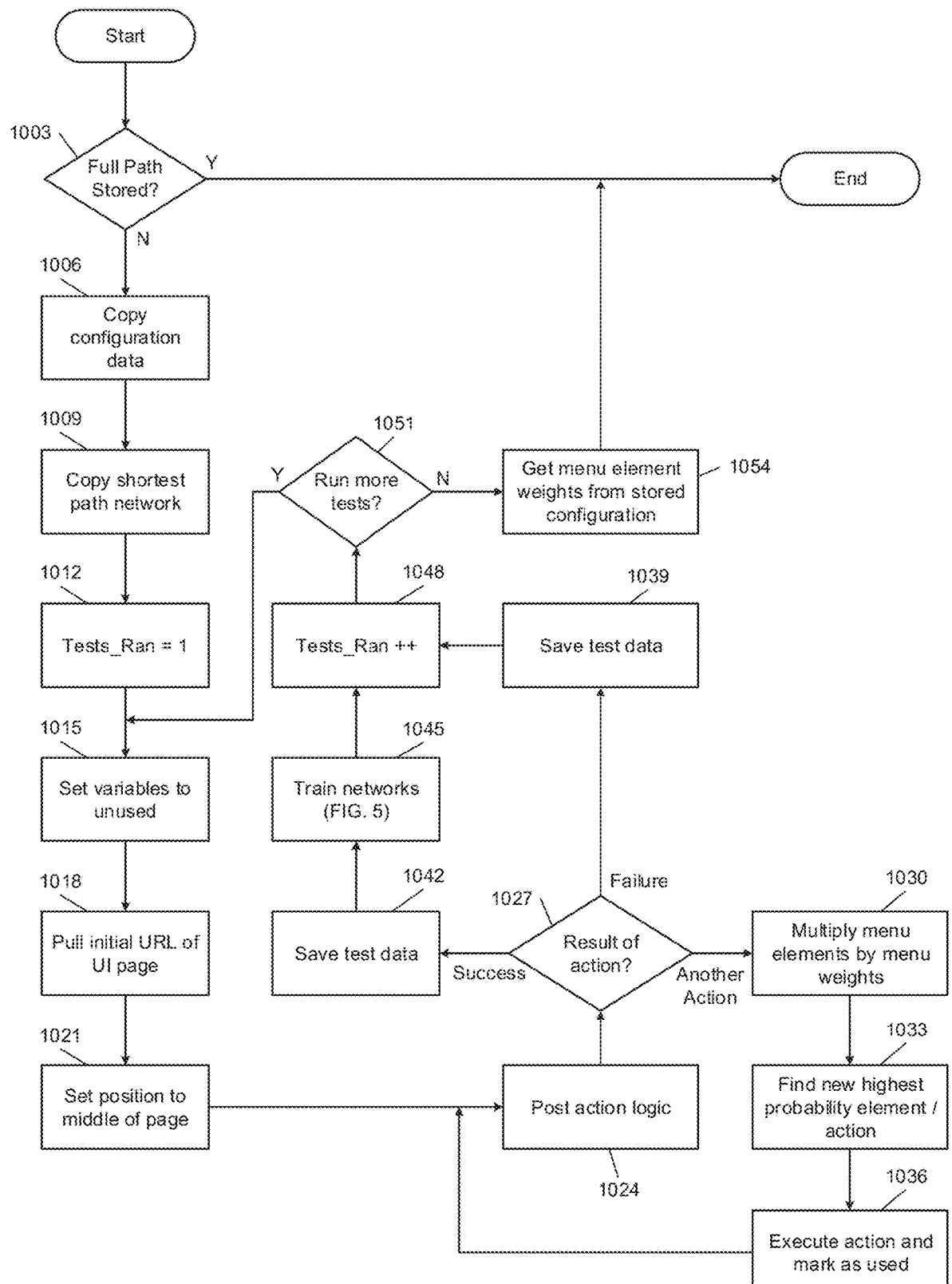
FIG. 10 is a flowchart depicting an example method of generating a full preferred path to a given goal in a UI based on preferred path information.

FIG. 10 is a flowchart depicting an example method of generating a full preferred path to a given goal in a UI based on preferred path information. Although the example method is described below with respect to the UI testing and enhancement device 410, the method may be implemented in other devices and/or systems. In various implementations, control may be performed by the path module 420 and/or the analysis module 432.

Control begins at 1003, where control determines whether a full preferred path is already stored. If so, control ends. If a full preferred path is not already stored, control proceeds to 1006 to copy configuration data (for example, a previously stored configuration of menu weights, etc.), and to 1009 to copy a shortest path network (such as, as determined according to the method of FIGS. 6A and 6B, as determined at 801 of FIG. 8, etc.).

In order to initialize the process for generating the full preferred path, control sets a count (Tests_Ran) to an initial value of one at 1012, and sets each variable in the configuration to unused at 1015. Control then obtains an initial URL of the UI page (such as a website), at 1018, and sets a position (such as a cursor position) to the middle of the UI page at 1021.

At 1024, control implements any logic associated with the latest action taken during the testing procedure (for example, any logic associated with setting the position to the middle of the page at 1021), and then determines a result of the action at 1027. If the current state of the UI, after implementing any logic associated with taking the latest action at 1024, does not indicate that the given goal has been reached or that no further actions are possible, control may determine at 1027 that another action should be taken.

If control determines at 1027 that another action should be taken because the state of the UI does not indicate a current success or failure, control proceeds to 1030 to multiply menu elements by menu weights. For example, menu elements in the current UI may be multiplied by menu weights from the configuration data copied at 1006, menu weights from another stored configuration, menu weights updated during preferred path generation or network training, etc.

Control then proceeds to 1033, to find a new highest probability element or action. For example, control may determine a list of possible actions based on the current state of the UI, may obtain a list of possible actions from a previously stored configuration, etc. The list of possible actions may be based on the links, buttons, data entry fields, etc. that are displayed in the current state of the UI.

Each element or action may be associated with a probability of leading to the given goal of the UI (for example, a probability that clicking on a link will eventually lead to a desired page of the website, etc.). The probabilities may be stored from a previous configuration, may be determined by the control, may be updated by training the network or multiplying the menu elements by the menu weights at 1030, etc.

At 1033, control determines the next element and associated action having the highest probability of leading to the given goal. Control then proceeds to 1036 to execute the determined action and mark the determined action as used in the action variable list. After executing the action at 1036, control performs any logic associated with executing the action at 1024 and then determines the result of executing the action at 1027.

If the result of the action is determined to be a failure at 1027, control proceeds to save the failure test data at 1039. For example, if the action from 1036 (and any post action logic from 1024) places the UI in a current state that does not include the goal, and the current state of the UI does not include any further actions that may progress towards the goal, control may determine that a failure has occurred.

Alternatively, if the result of the action is determined to be a success at 1027, control proceeds to save the success test data at 1042. For example, if the action from 1036 (and any post action logic from 1024) places the UI in a current state that includes the goal, control may determine that a success has occurred.

After saving the success test data at 1042, control proceeds to train networks at 1045. For example, the success test data may be used to train one or more networks 502 as illustrated in FIG. 5, to tune the probabilities associated with a likelihood of reaching a given goal via different UI elements or actions, to tune weights associated with menu elements of the UI, etc.

Once the network(s) are trained at 1045, or after saving failure test data at 1039, Tests_Ran is incremented at 1048. Control then proceeds to 1051 to determine whether there are any more tests to run. For example, a threshold number of tests may be specified for optimizing the networks, probabilities, weights, etc. to generate the full preferred path. If Tests_Ran is below the threshold at 1051, control may proceed back to 1015 to run another initialized test. Otherwise, control proceeds to 1054 to receive menu weights from the stored configuration data (such as, from the success test data stored at 1042, etc.). Control then ends the process.

Preferred Path Visualization and Scoring

Figure 11:
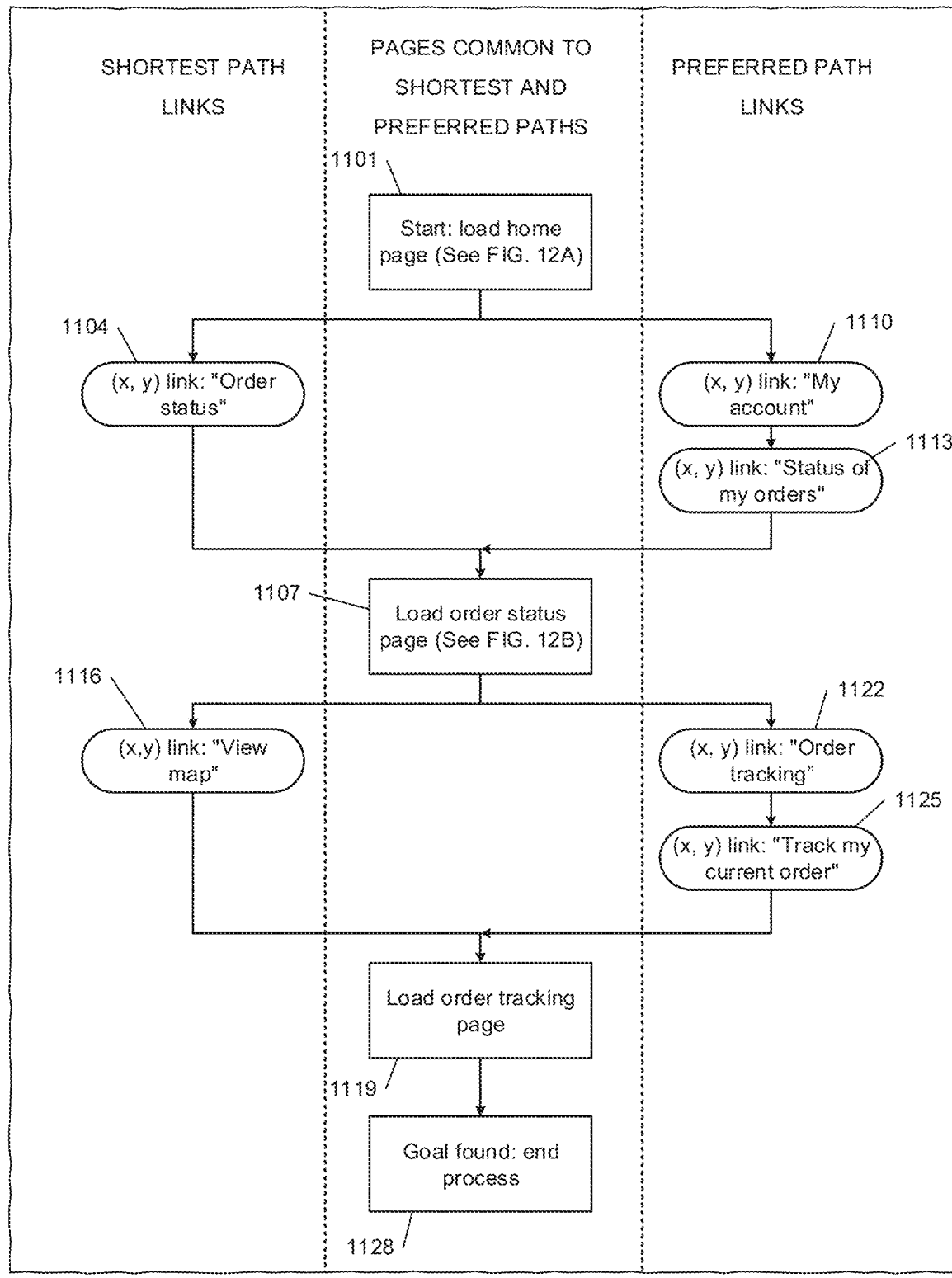
FIG. 11 is a graphical representation of a comparison between links in an example shortest path to a given goal in a UI, links in an example preferred path to the given goal in the UI, and webpages that are common to the shortest path and the preferred path.

FIG. 11 is a graphical representation of a comparison between links in an example shortest path to a given goal in a UI, links in an example preferred path to the given goal in the UI, and webpages that are common to the shortest path and the preferred path. Although the example method is described below with respect to the UI testing and enhancement device 410, the method may be implemented in other devices and/or systems.

Figure 12A:
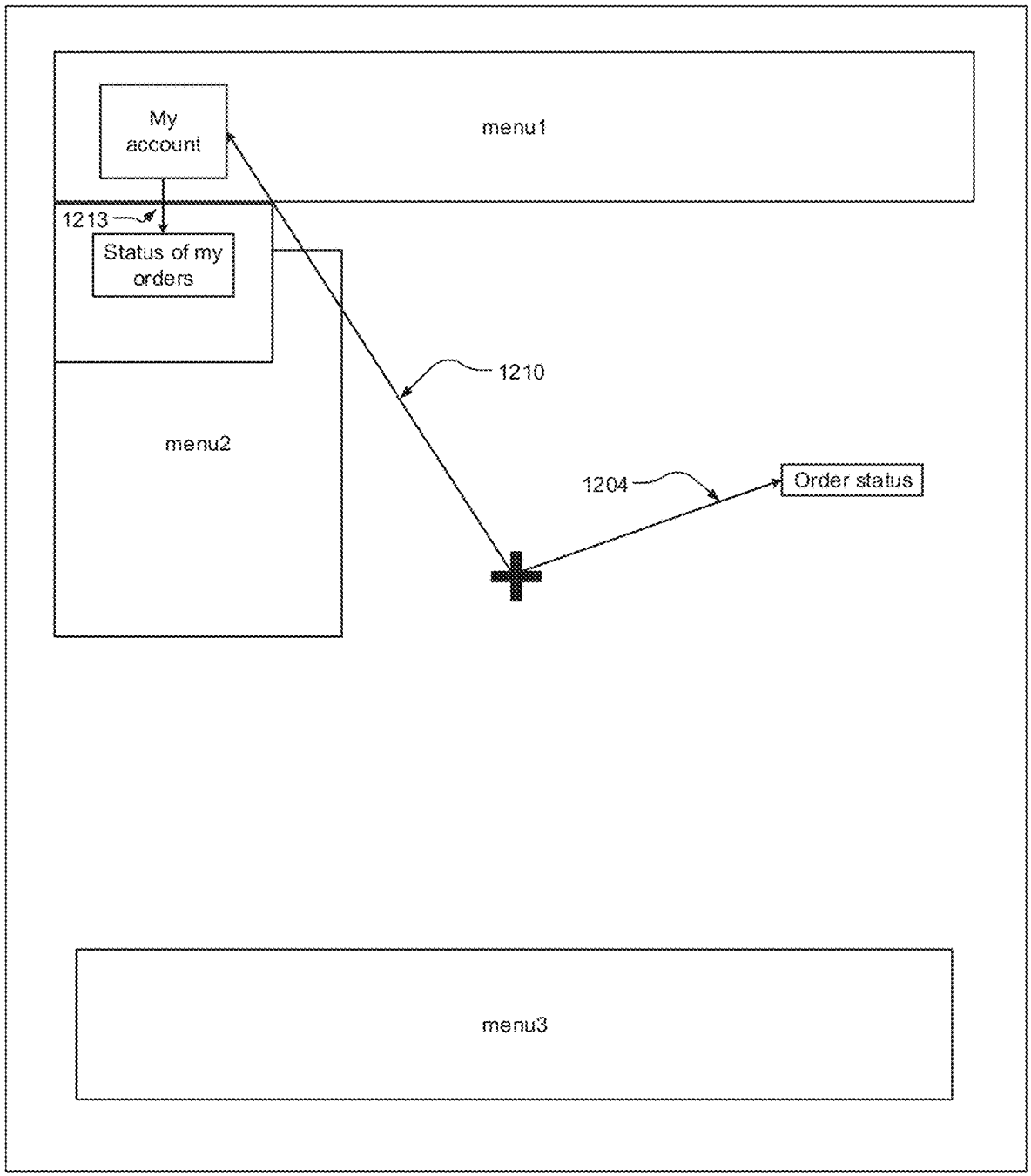
FIGS. 12A and 12B are graphical representations of example webpages common to both the example shortest path and the example preferred path illustrated in FIG. 11.

For comparing the shortest path to the preferred path, the graphical representation illustrated in FIG. 11 is divided into three columns. The center column illustrates pages or steps of the UI (such as webpages or states of a web or native application) that are common to both the shortest path and the preferred path. For example, this includes pages that are displayed identically when a user implements the shortest path to navigate the UI and when the user implements the preferred path to navigate the UI. This also includes steps within a page that are performed by both the user following the shortest path to navigate the UI and the user following the preferred path to navigate the UI. For example, at 1101, both the shortest path and the preferred path start by loading the home page of the UI. An example of a UI home page is illustrated in FIG. 12A.

Figure 12B:
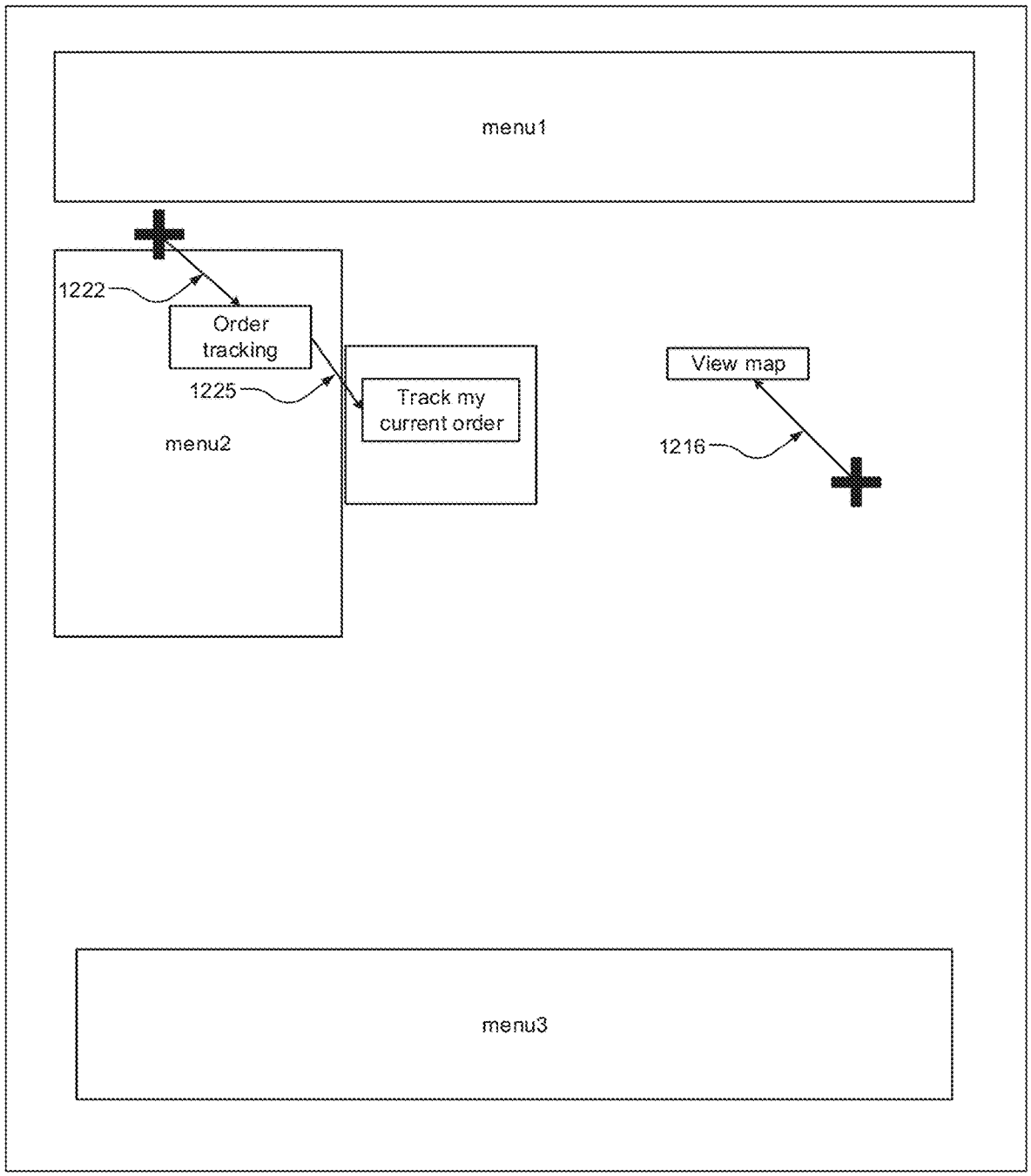

After the home page is displayed at 1101, the shortest path and the preferred path take different routes. As shown at 1104 in the left column of FIG. 11, a user navigating the shortest path moves the mouse cursor (or, equivalently, their finger or a stylus) to a link titled "Order status," which is located at an (x, y) coordinate on the home page. This shortest path movement action is illustrated at 1204 in FIG. 12A. Once the user selects the "Order status" link, the shortest path proceeds to load the order status page at 1107. An example of the displayed order status page is illustrated in FIG. 12B.

In contrast to the shortest path, the right column of FIG. 11 illustrates that in the preferred path, at 1110, a user moves the mouse cursor to a link titled "My account" on the home page. This preferred path movement action is illustrated at 1210 in FIG. 12A.

Next, the mouse cursor is moved to select a "Status of my orders" link at 1113. This preferred path movement action is illustrated at 1213 in FIG. 12A. After the "Status of my order" link is selected, the preferred path proceeds to load the order status page at 1107. As shown in FIG. 11, loading the order status page at 1107 is common to both the shortest path and the preferred path, because both paths arrive at the same page via the different links illustrated in FIG. 11.

Specifically, the shortest path uses a single "Order status" link at 1104 to reach the order status page, while the preferred path uses two links (i.e., "My account" at 1110 and "Status of my orders" at 1113) to reach the order status page. For example, an experienced user who is familiar with the UI may recognize the ability to load the order status page by selecting the "Order status" link directly on the home page, while a new user of the UI may intuitively proceed though the "My account" link to the "Status of my orders" link because the new user is not aware of the option to directly select the "Order status" link on the home page.

FIGS. 11 and 12A-12B allow the user to visualize each point where the shortest path and the preferred path diverge. These divergence points may be illustrated on the same page to assist the developer in visualizing navigation shortcuts through different menus via each path, etc.

As mentioned above, the order status page is loaded at 1107, and an example order status page is illustrated in FIG. 12B. In the shortest path illustrated in the left column, the mouse cursor is moved to select a "View map" link at 1116. This example movement is illustrated at 1216 in FIG. 12B. The shortest path then loads an order tracking page (not shown) at 1119.

In contrast to the shortest path, the preferred path includes a user selecting an "Order tracking" link at 1122, and then selecting a "Track my current order" link at 1125. These example movements are illustrated at 1222 and 1225, respectively, in FIG. 12B. The preferred path then proceeds to load the order tracking page at 1119, similar to the shortest path. The order tracking page is the goal of the shortest and preferred paths, so each path then ends at 1128 because the goal order tracking page has been found.

Figure 13:
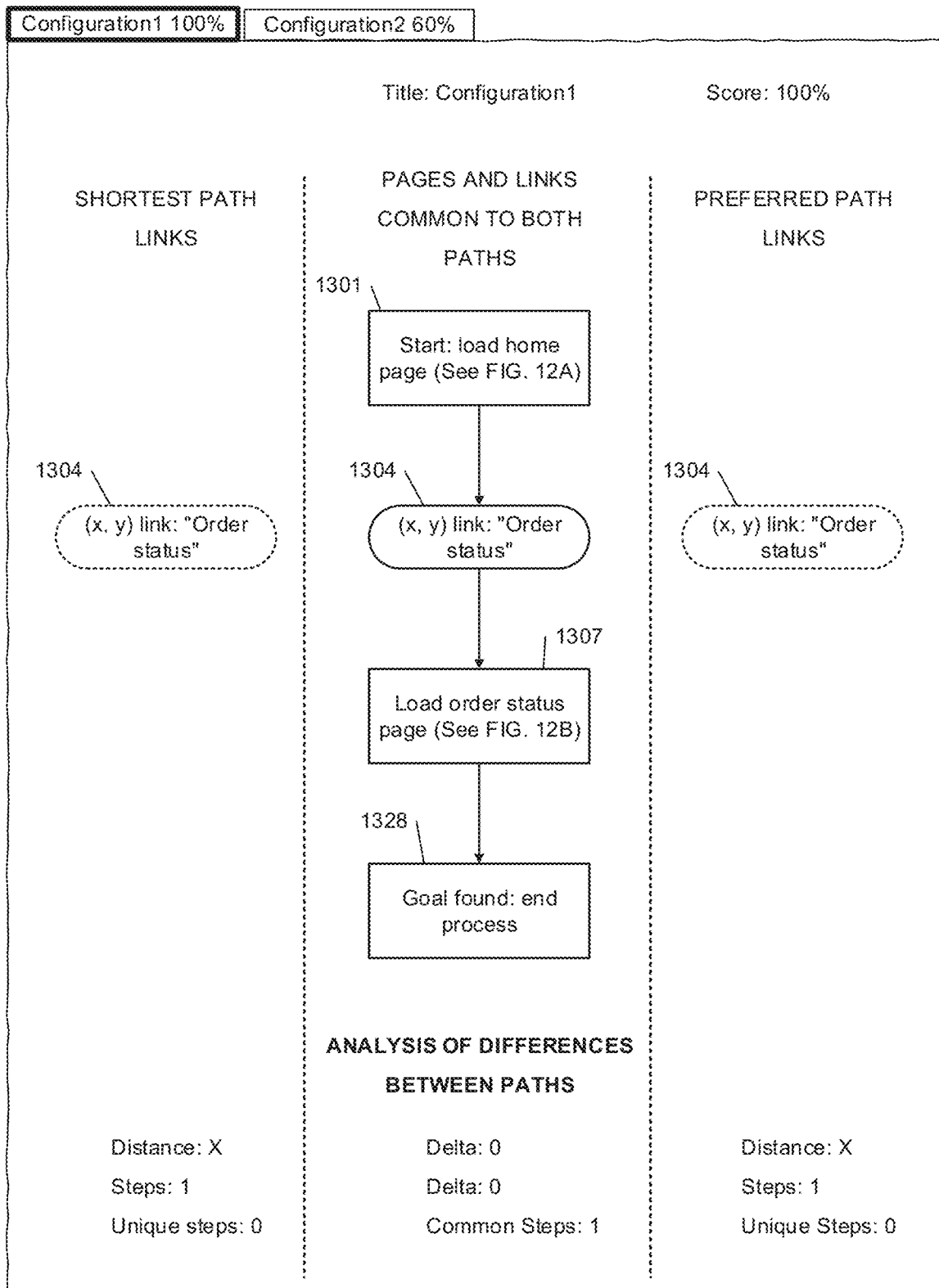
FIG. 13 is a graphical representation of a comparison between links in an example shortest path to a given goal in a UI, to links in multiple example preferred paths to the given goal in the UI, with analysis data indicative of differences between the paths.

FIG. 13 is a graphical representation of a comparison between links in an example shortest path to a given goal in a UI, to links in multiple example preferred paths to the given goal in the UI, with analysis data indicative of differences between the paths. FIG. 13 is similar to the graphical comparison of the differences between the paths illustrated in FIG. 11, but FIG. 13 provides additional analysis data and allows for multiple preferred path configurations to be displayed.

For example, FIG. 13 illustrates a comparison of a first preferred path—"Configuration 1"—to the shortest path. In this simple example, loading the order status page at 1307 is the given goal for the paths. Both the shortest path and the preferred path are identical in this simple example, because both paths start by loading a home page at 1301, then receive a selection of the "Order status" link at 1304, then proceed to load the order status page at 1307. In both paths, reaching the order status page ends the process at 1328.

The "Order status" links are illustrated in broken lines in both the left column and the right column to illustrate that both paths use the same link at 1304. In this simple example, the graphical representation of FIG. 13 may include empty left and right columns because all path elements are common to both the shortest path and the preferred path.

An analysis of differences between the paths is illustrated at the bottom of FIG. 13. For example, the shortest path and the preferred path each include one step, which requires a same distance of X to move from the stating center point of the loaded home page to the "Order status" link at (x, y). Therefore, the difference "Delta" in the center column is zero for both distance and steps, because the distance moved and the number of steps taken is the same for both paths. Additionally, the unique steps for each path is zero, while they share a single common step.

In contrast, if the shortest path and preferred path had different distances and numbers of steps taken, the analysis portion could indicate the differences between the paths via the "Delta" values. Any steps unique to the shortest path and/or the preferred path would be illustrated in the analysis section.

FIG. 13 also illustrates an example matching score at the top of the graphical representation. For example, the matching score for "Configuration 1" is 100% because the shortest path and the preferred path are identical to one another. As shown in the top tabs of FIG. 13, another preferred path called "Configuration 2" (not shown) only has a 60% match with the shortest path. The user may toggle between the multiple preferred paths by selecting the different tabs corresponding to each preferred path.

For example, developers can input multiple configurations to be tested, where each configuration has a different name and a different associated layout. The results of each configuration are accessible in different tabs. Results for each configuration may include a flowchart visualization, a comparison score, etc. Tabs may be used to quickly identify the layout, scores, names, etc. of the different preferred path configurations.

FIGS. 14A-14D are graphical representations of an example algorithm for scoring a difference between an example shortest path to a given goal in a UI and an example preferred path to the given goal in the UI.

For example, each path is represented as a weighted, directed, acyclic graph. Arc weights correspond to distances (such as Euclidian x and y movements on the UI page) and nodes correspond to elements (such as components of the UI page that are selected by a user). The page cursor origin (such as the root node) is not associated with an element, but instead with the path origin (such as a middle x, y coordinate on the page).

Figure 14A:
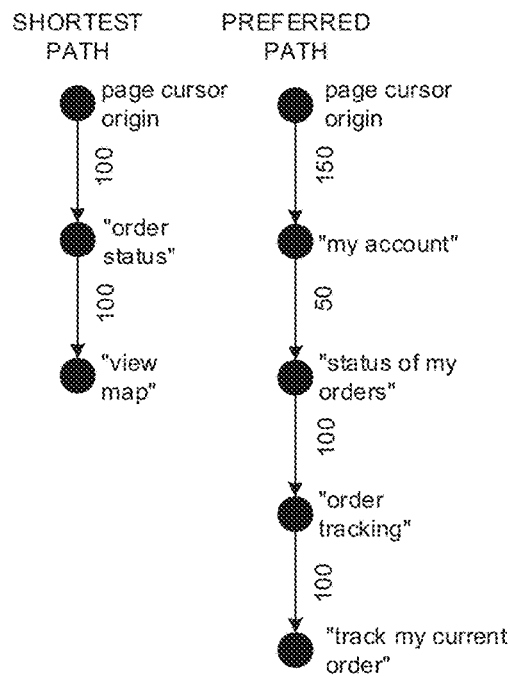
FIGS. 14A-14D are graphical representations of an example algorithm for scoring a difference between an example shortest path to a given goal in a UI and an example preferred path to the given goal in the UI.

In FIG. 14A, a first path (such as a shortest path) includes a movement of 100 (such as pixels, millimeters, etc.) from the page cursor origin to click on the "order status" link. Then, another movement of 100 occurs from the "order status" link to the "view map" link.

Separately, the second path (such as a preferred path) includes a click on the "my account" link that is located at a distance of 150 from the page cursor origin. The path then moves a distance of 50 to the "status of my orders" element, a distance of 100 to the "order tracking element, and a distance of 100 to the "track my current order" element.

Figure 14B:
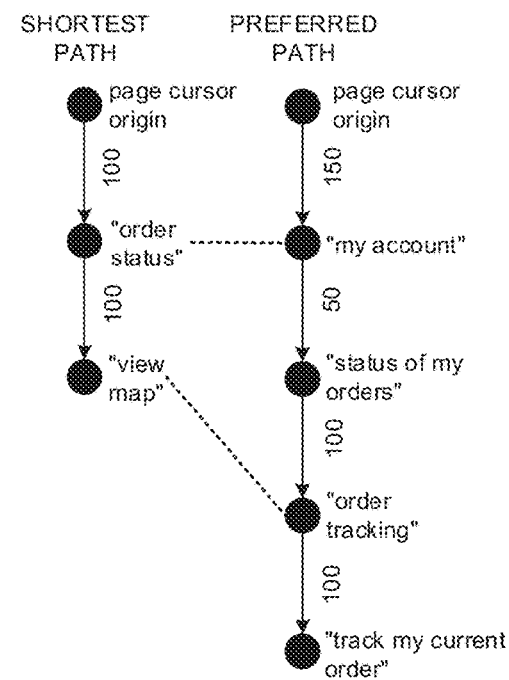

In this first step of the example scoring algorithm, the elements and distances for each action in the paths are represented graphically with the arcs and nodes as illustrated in FIG. 14A. Next, pairs of corresponding nodes between the shortest and preferred paths are identified as shown in FIG. 14B. For example, the "order status" node of the shortest path is paired with the "my account" node of the preferred path, and the "view map" node of the shortest path is paired with the "order tracking" node of the preferred path.

Nodes may be paired according to any suitable pairing method, such as pairing nodes that are indicative of a first action on each new UI page. For example, the "order status" link of the shortest path and the "my account" link of the preferred path both indicate the first action taken by the user on the home page of the UI. Similarly, the "view map" link of the shortest path and the "order tracking" link of the preferred path both indicate the first action taken on the order status page of the UI.

Other suitable pairing rules may be implemented, which may follow an order of precedence. For example: (1) paired node elements must be located on the same page; (2) nodes corresponding to the same elements must be paired; (3) nodes should be paired chronologically; and (4) non-matched nodes may be left unpaired.

Figure 14C:
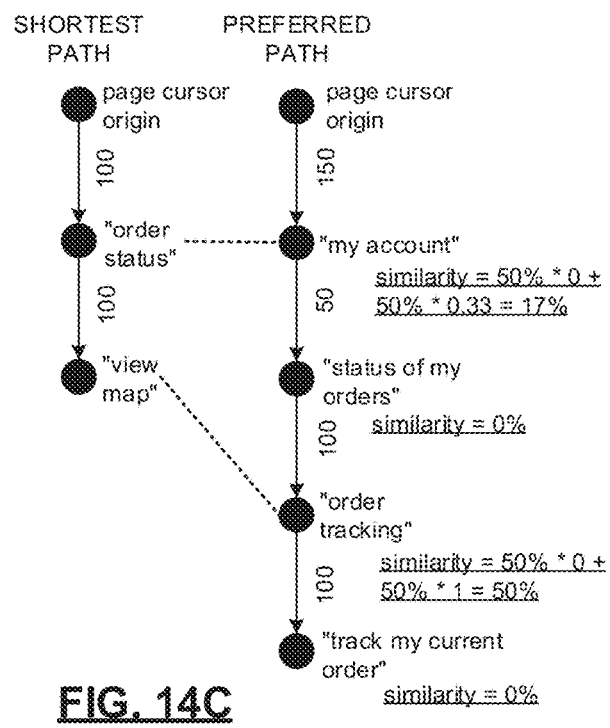

In the third step of the scoring algorithm, as illustrated in FIG. 14C, a similarity score is calculated for each node in the preferred path. For example, each unpaired node may receive a similarity score of 0%, while each paired node is scored based on a weighted similarity of the preferred path node with its paired shortest path node. The unpaired nodes "status of my orders" and "track my current order" receive similarity scores of 0%.

One example similarity scoring calculation for paired nodes 50%*the similarity between the nodes (i.e., 1 if the preferred path node element is the same as the shortest path node element, and 0 otherwise), +50%*the similarity of the distance of the edge leading into the node. As shown in FIG. 14C, the similarity score of the "my account" node is calculated as 50%*0 (because the "my account" element of the preferred path node is not the same as the "order status" node of the shortest path), +50%*0.33 (because the difference in edges leading into the nodes is 150-100/150). This results in a similarity score for the "my account" node of 17%, indicating that the "my account" node of the preferred path is 17% similar to the "order status" node of the shortest path.

Further, the similarity score of the "order tracking" node is calculated as 50%*0 (because the "order tracking" element of the preferred path node is not the same as the "view map" node of the shortest path), +50%*1 (because the edge leading into the "order tracking" node of the preferred path has the same distance of 100 as the edge leading into the "view map" node of the shortest path). This results in a similarity score for the "order tracking" node of 50%, indicating that the "order tracking" node of the preferred path is 50% similar to the "order tracking" node of the shortest path.

The edge similarity score may be determined by any suitable comparison calculation for the shortest path and preferred path edge distances, such as a weight of the edge into the shortest path node/a weight of the edge into the preferred path node. As another example, the edge similarity scores could be calculated as similarity score=$\frac{1}{2}-1/pi*\tan^{-1}(\ln(|x|/n))$, where x is the weight of the edge to the shortest path node—the weight of the edge into the preferred path node, n is a normalization constant such as ln(1000), and the edge similarity equals one if the weights are equal.

Figure 14D:
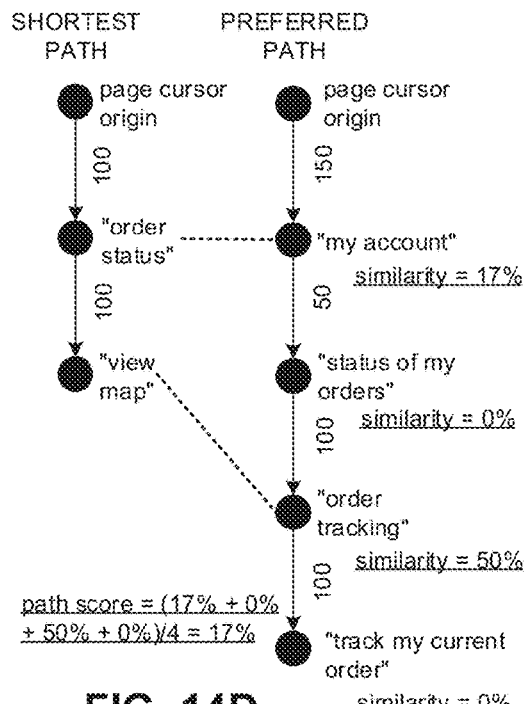

FIG. 14D illustrates an example fourth step of the scoring algorithm where a final score is assigned to the whole preferred path. For example, the similarity scores of all nodes in the preferred path may be averaged to generate the final score for the preferred path. A maximum of the number of non-root nodes in either the shortest path or the preferred path may be determined, and the maximum may be used as the divisor to determine the final average score for the preferred path.

For example, in FIG. 14D the shortest path include two non-root nodes and the preferred path includes four non-root nodes. Therefore, the determined maximum value used for the final score averaging is four. The four node scores of the preferred path are added together (17%+0%+50%+0%), and divided by the determined max node value of four, to generate an overall score of 17% for the preferred path in FIG. 14D.

Although FIGS. 14A-14D illustrate on example scoring algorithm, other embodiments may use different suitable scoring algorithms for determining similarity scores for each node, for comparing edge weights, for determining an overall similarity score for the path, etc. Although the embodiments of FIGS. 14A-14D describe an algorithm for determining an overall score indicative of a similarity of the preferred path with reference to the shortest path, in other embodiments the preferred path may be used as a reference and an overall similarity score may be calculated for the shortest path.

Figure 15A:
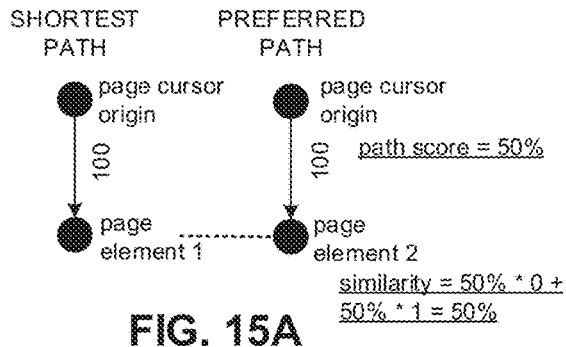
FIGS. 15A-15F are graphical representations of the example algorithm of FIGS. 14A-14D as applied to comparisons of multiple different example shortest paths and preferred paths.
Figure 15B:
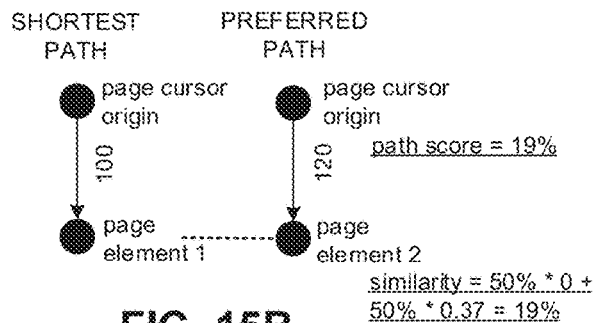

FIGS. 15A-15F are graphical representations of the example algorithm of FIGS. 14A-14D as applied to comparisons of multiple different example shortest paths and preferred paths. For example, FIG. 15A illustrates a similarity score of 50% when each path includes a distance of 100 to a single node, but the node elements are different. FIG. 15B illustrates a path score of 19% when the single elements of each path are different, but the shortest path includes an edge weight of 100 and the preferred path includes an edge weight of 120.

Figure 15C:
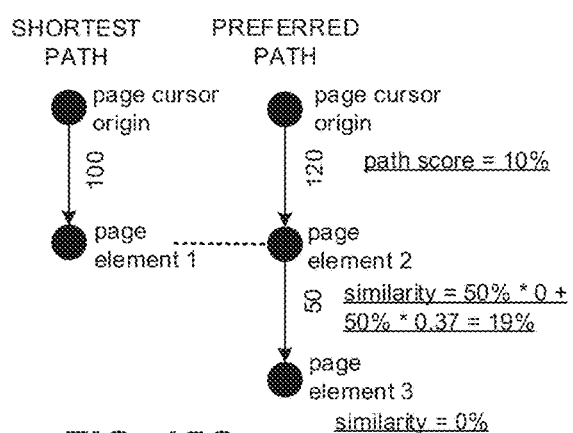
Figure 15D:
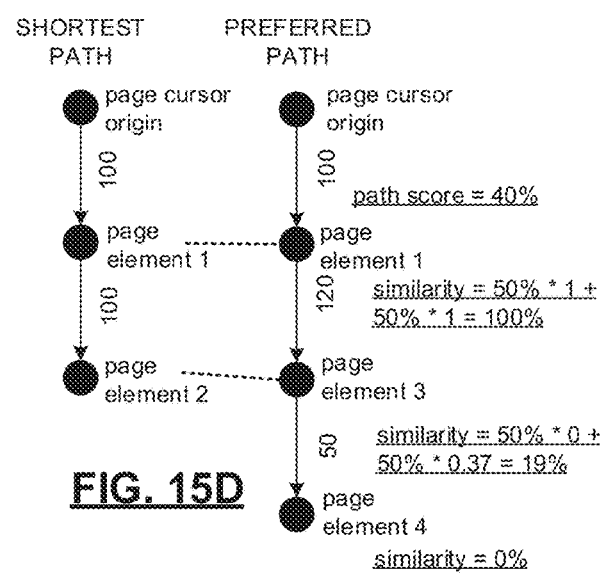

FIG. 15C extends the example of FIG. 15B by adding another element to the preferred path with an additional edge weight of 50. This reduces the path score to 10%. FIG. 15D illustrates an example where the shortest path and the preferred path start out with the same element node and the same edge weight, but then the shortest path leads to a second element while the preferred path leads to separate third and fourth elements. This results in a path score of 40%.

Figure 15E:
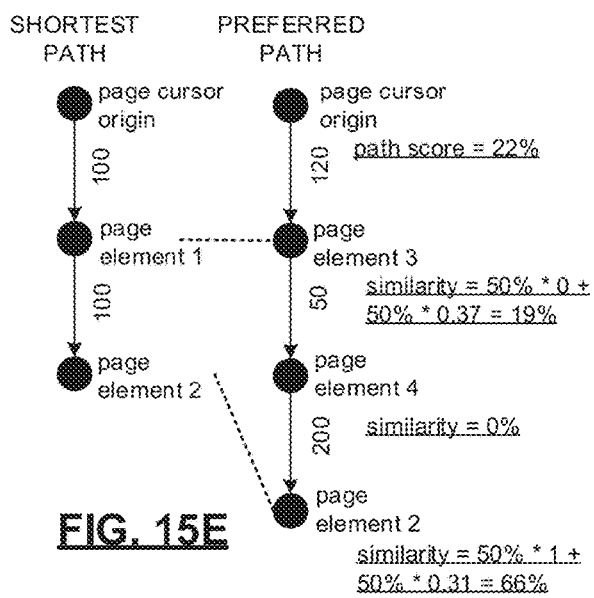
Figure 15F:
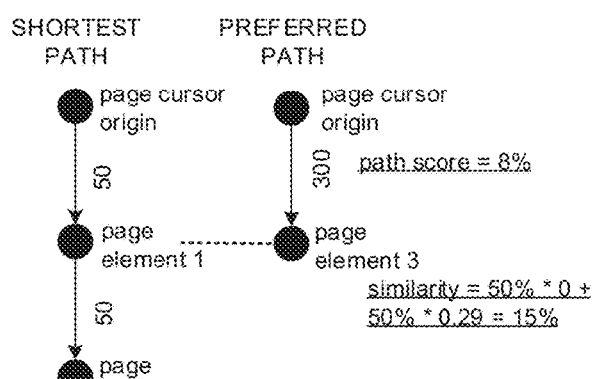

FIG. 15E is similar to the example of FIG. 15D, but edge weights and node elements are changed in the preferred path, leading to a path score of 22%. In the example of FIG. 15F, the shortest path includes two element while the preferred path includes only one at a much longer distance. This results in a path score of 8%.

Figure 16:
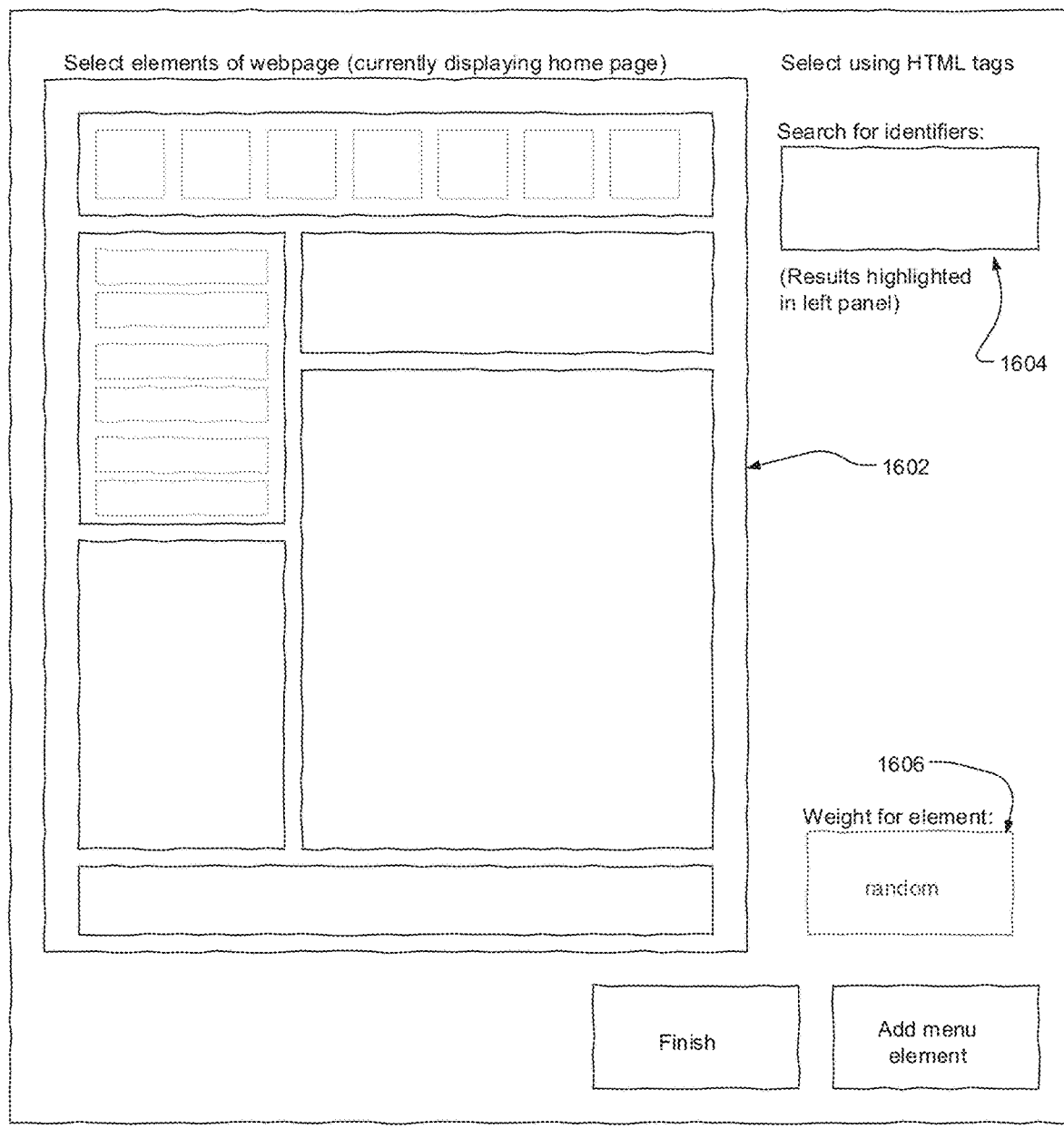
FIG. 16 is a graphical representation of an example UI for selecting menu elements.

FIG. 16 is a graphical representation of an example UI for selecting menu elements. For example, the UI may be used to select elements for a weighted menu element input type, for an input type of generating a stored configuration, etc. A developer may choose menu elements by clicking on them in the home page 1602, which may be displayed based on an obtained root URL of the site. Additionally or alternatively, a developer may search for elements using HTML identifiers at 1604.

After selecting a menu element, the developer may enter a weight for the selected element, or the developer may select a randomized weight, at 1606 (for example, in a saved configuration generator, the weight for each menu element may be randomized). The developer may then add additional menu elements or finish selecting menu elements.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computer system for testing a user interface, the computer system comprising:
a memory circuit configured to store instructions; and
a processor circuit configured to execute the instructions, wherein the instructions include:
obtaining a state of the user interface;
setting a current position to a specified location within the user interface;
executing one or more user interface tests according to the obtained state of the user interface and the current position to generate a plurality of paths;
determining a shortest path toward a goal location in the user interface by identifying a path of the plurality of paths having a minimum distance that satisfies a set of criteria, wherein:
a distance for a particular path is based on two-dimensional distances between pairs of consecutive positions that include the current position as well as positions, along the particular path, of user interface elements requiring interaction to satisfy the set of criteria; and
determining the shortest path includes:
determining a set of possible actions based on user interface elements in the obtained state of the user interface;
for each action in the set of possible actions:
determining a probability that performing the action satisfies the set of criteria; and
storing the probability in the set of possible actions; and
selecting the action from the set of possible actions based on probabilities stored in the set of possible actions;
receiving preferred path information indicative of a specified path through the user interface toward the goal location in the user interface;
generating a preferred path based on the received preferred path information;
comparing the determined shortest path to the generated preferred path; and
in response to comparing the determined shortest path to the generated preferred path, outputting an analysis result.

2. The computer system of claim 1 wherein:
each path of the one or more user interface tests comprises user interface events and is characterized by a distance; and
for each path, the distance of the path is based on a sum of Euclidean distances between pairs of consecutive positions of user interface elements corresponding to user interface events in the path.

3. The computer system of claim 1, wherein the instructions further include:
analyzing a designated state of the user interface;
in response to determining that the designated state satisfies the set of criteria, setting a success indicator as an outcome;
in response to determining that the designated state of the user interface does not satisfy the set of criteria, determining the set of possible actions based on user interface elements within the designated state and set the set of possible actions as the outcome, wherein the set of possible actions includes movements, inputs, or actions required to satisfy the set of criteria;
in response to the outcome being the set of possible actions:
selecting an action from the set of possible actions, wherein the action is associated with a first user interface element;
identifying a point of the first user interface element;
updating a test distance based on (i) coordinates of the point and (ii) coordinates of the current position;
setting the current position to the point;
executing the selected action; and
supplementing test data with (i) the selected action and (ii) the set of possible actions; and
in response to the outcome being the success indicator, storing the test distance and the test data in a set of completed user interface tests.

4. The computer system of claim 3, wherein the instructions further include:
selectively using at least one neural network of a plurality of neural networks to determine the probability that performing the action satisfies the set of criteria.

5. The computer system of claim 4, further comprising a training module configured to:
in response to the outcome being the success indicator:
train the plurality of neural networks using the test data; and
determine a performance of the plurality of neural networks after training based on the probabilities stored in the set of completed user interface tests; and
in response to determining that a value of the performance of the plurality of neural networks after training is greater than a predetermined value, set a status of the plurality of neural networks to trained.

6. The computer system of claim 1, wherein the analysis result includes:
a calculated score indicative of a similarity between (i) distances and elements of the determined shortest path and (ii) distances and elements of the generated preferred path; and
a graphical visualization illustrating one or more links in the user interface that are common to the determined shortest path and the generated preferred path, and wherein the graphical visualization illustrates links that are different between the determined shortest path and the generated preferred path.

7. The computer system of claim 1, wherein the instructions further include:
receiving the preferred path information by entry of a full preferred path via document object model (DOM) recording of interactions with the user interface;
receiving the preferred path information by retrieval of stored menu element weights for menu elements of the user interface; and
receiving the preferred path information by storing a configuration of randomized and trained menu element weights for menu elements of the user interface.

8. A method of testing a user interface, the method comprising:
obtaining a state of the user interface;
setting a current position to a specified location within the user interface;
executing one or more user interface tests according to the obtained state of the user interface and the current position to generate a plurality of paths;

determining a shortest path toward a goal location in the user interface by identifying a path of the plurality of paths having a minimum distance that satisfies a set of criteria, wherein:
  a distance for a particular path is based on two-dimensional distances between pairs of consecutive positions that include the current position as well as positions, along the particular path, of user interface elements requiring interaction to satisfy the set of criteria; and
  determining the shortest path includes:
    determining a set of possible actions based on user interface elements in the obtained state;
    for each action in the set of possible actions:
      determining a probability that performing the action satisfies the set of criteria; and
      storing the probability in the set of possible actions; and
    selecting the action from the set of possible actions based on probabilities stored in the set of possible actions;
receiving preferred path information indicative of a specified path through the user interface toward the goal location in the user interface;
generating a preferred path based on the received preferred path information;
comparing the determined shortest path to the generated preferred path; and
in response to comparing the determined shortest path to the generated preferred path, outputting an analysis result.

9. The method of claim 8, wherein:
each path of the one or more user interface tests comprises user interface events and is characterized by a distance; and
for each path, the distance of the path is based on a sum of Euclidean distances between each pair of consecutive positions of user interface elements corresponding to user interface events in the path.

10. The method of claim 8, further comprising:
analyzing a designated state of the user interface;
in response to determining that the designated state satisfies the set of criteria, setting a success indicator as an outcome;
in response to determining that the designated state of the user interface does not satisfy the set of criteria, determining the set of possible actions based on user interface elements within the designated state and setting the set of possible actions as the outcome, wherein the set of possible actions includes linear movements, inputs, or actions required to satisfy the set of criteria;
in response to the outcome being the set of possible actions:
  selecting an action from the set of possible actions, wherein the action is associated with a first user interface element;
  identifying a point of the first user interface element;
  updating a test distance based on (i) coordinates of the point and (ii) coordinates of the current position;
  setting the current position to the point;
  executing the selected action; and
  supplementing test data with (i) the selected action and (ii) the set of possible actions; and
in response to the outcome being the success indicator, storing the test distance and the test data in the one or more user interface tests.

11. The method of claim 10, further comprising:
operating a plurality of neural networks; and
selectively using at least one neural network of the plurality of neural networks to determine the probability that performing the action satisfies the criteria for the goal.

12. The method of claim 11, further comprising, in response to the outcome being the success indicator:
training the plurality of neural networks using the test data;
determining a performance of the plurality of neural networks after training based on the probabilities stored in a set of completed user interface tests; and
in response to determining that a value of the performance of the plurality of neural networks after training is greater than a predetermined value, setting a status of the plurality of neural networks to trained.

13. The method of claim 8, wherein the analysis result includes:
a calculated score indicative of a similarity between (i) distances and elements of the determined shortest path and (ii) distances and elements of the generated preferred path; and
a graphical visualization illustrating (i) one or more links in the user interface that are common to the determined shortest path and the generated preferred path, and (ii) links that are different between the determined shortest path and the generated preferred path.

14. The method of claim 8, further comprising receiving the preferred path information by at least one of:
entry of a full preferred path via document object model (DOM) recording of interactions with the user interface;
retrieval of stored menu element weights for menu elements of the user interface; and
storing a configuration of randomized and trained menu element weights for menu elements of the user interface.

15. A non-transitory computer-readable storage medium storing processor-executable instructions, the instructions comprising:
obtaining a state of a user interface;
setting a current position to a specified location within the user interface;
executing one or more user interface tests according to the obtained state of the user interface and the current position to generate a plurality of paths;
determining a shortest path toward a goal location in the user interface by identifying a path of the plurality of paths having a minimum distance that satisfies a set of criteria, wherein:
  a distance for a particular path is based on two-dimensional distances between pairs of consecutive positions that include the current position as well as positions, along the particular path, of user interface elements requiring interaction to satisfy the set of criteria; and
  determining the shortest path includes:
    determining a set of possible actions based on user interface elements in the obtained state;
    for each action in the set of possible actions:
      determining a probability that performing the action satisfies the set of criteria; and
      storing the probability in the set of possible actions; and
    selecting the action from the set of possible actions based on probabilities stored in the set of possible actions;

receiving preferred path information indicative of a specified path through the user interface toward the goal location in the user interface;

generating a preferred path based on the received preferred path information;

comparing the determined shortest path to the generated preferred path; and in response to comparing the determined shortest path to the generated preferred path, outputting an analysis result.

16. The non-transitory computer-readable storage medium of claim 15, wherein:

each path of the one or more user interface tests comprises user interface events and is characterized by a distance; and for each path, the distance of the path is based on a sum of Euclidean distances between pairs of consecutive positions of user interface elements corresponding to user interface events in the path.

17. The non-transitory computer-readable storage medium of claim 15, wherein to the instructions further include:

analyzing a designated state of the user interface;

in response to determining that the designated state satisfies the set of criteria, setting a success indicator as an outcome;

in response to determining that the designated state of the user interface does not satisfy the set of criteria, determining the set of possible actions based on user interface elements within the designated state and set the set of possible actions as the outcome, wherein the set of possible actions includes movements, inputs, or actions required to satisfy the set of criteria;

in response to the outcome being the set of possible actions:

selecting an action from the set of possible actions, wherein the action is associated with a first user interface element;

identifying a point of the first user interface element;

updating a test distance based on (i) coordinates of the point and (ii) coordinates of the current position;

setting the current position to the point;

executing the selected action; and supplementing test data with (i) the selected action and (ii) the set of possible actions; and in response to the outcome being the success indicator, storing the test distance and the test data in a set of completed user interface tests.

18. The non-transitory computer-readable storage medium of claim 17, wherein the instructions further include:

selectively using at least one neural network of a plurality of neural networks to determine the probability that performing the action satisfies the set of criteria.

19. The non-transitory computer-readable storage medium of claim 18, further comprising a training module configured to:

in response to the outcome being the success indicator:

train the plurality of neural networks using the test data; and determine a performance of the plurality of neural networks after training based on the probabilities stored in the set of completed user interface tests; and in response to determining that a value of the performance of the plurality of neural networks after training is greater than a predetermined value, set a status of the plurality of neural networks to trained.

20. The non-transitory computer-readable storage medium of claim 15, wherein the analysis result includes:

a calculated score indicative of a similarity between (i) distances and elements of the determined shortest path and (ii) distances and elements of the generated preferred path; and a graphical visualization illustrating one or more links in the user interface that are common to the determined shortest path and the generated preferred path, and wherein the graphical visualization illustrates links that are different between the determined shortest path and the generated preferred path.

* * * * *